(12) United States Patent
Tiwari et al.

(10) Patent No.: US 10,625,864 B2
(45) Date of Patent: Apr. 21, 2020

(54) POLYMERIC MASS TRANSIT TRAY TABLE ARM AND METHODS OF MAKING SAME

(71) Applicant: SABIC GLOBAL TECHNOLOGIES B.V., Bergen op Zoom (NL)

(72) Inventors: Anil Tiwari, Bilaspur (IN); Harindranath K. Sharma, Karnataka (IN); Norberto Robalo, Paris (FR)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 43 days.

(21) Appl. No.: 15/509,896

(22) PCT Filed: Sep. 9, 2015

(86) PCT No.: PCT/IB2015/056908
§ 371 (c)(1),
(2) Date: Mar. 9, 2017

(87) PCT Pub. No.: WO2016/038554
PCT Pub. Date: Mar. 7, 2016

(65) Prior Publication Data
US 2018/0222592 A1    Aug. 9, 2018

Related U.S. Application Data

(60) Provisional application No. 62/049,024, filed on Sep. 11, 2014.

(51) Int. Cl.
*B60N 3/00* (2006.01)
*B64D 11/06* (2006.01)
*B29C 45/73* (2006.01)

(52) U.S. Cl.
CPC .......... *B64D 11/0638* (2014.12); *B29C 45/73* (2013.01); *B60N 3/002* (2013.01); *B29C 2045/7356* (2013.01); *Y02T 50/46* (2013.01)

(58) Field of Classification Search
CPC ............ B64D 11/0638; B64D 11/0646; B64D 11/0605; Y10T 428/24537;
(Continued)

(56) References Cited

U.S. PATENT DOCUMENTS 2,865,309 A * 12/1958 Lich .......................... B61D 9/06
                                                        105/406.2
3,219,159 A * 11/1965 Donald ...................... B43L 3/00
                                                        190/16
(Continued)

FOREIGN PATENT DOCUMENTS

CA          2904874    * 10/2014
CN      102490632 A      6/2012
(Continued)

OTHER PUBLICATIONS

Chinese Patent No. 102490632; Date of Publication: Jun. 13, 2012; Abstract only; 1 page.
(Continued)

*Primary Examiner* — Janet M Wilkens
(74) *Attorney, Agent, or Firm* — Cantor Colburn LLP

(57) ABSTRACT

A method of making a support arm includes heating a mold to a glass transition temperature of a thermoplastic material; injecting the thermoplastic material comprising a filler into the mold and allowing the thermoplastic material to conform to the mold; cooling the mold to an ejection temperature to form the support arm; and ejecting the support arm from the mold; wherein a cross-section of the support arm taken along a line from an inner edge to an outer edge of the support arm comprises a first "U" shaped portion and a second "U" shaped portion.

18 Claims, 15 Drawing Sheets

(58) Field of Classification Search
CPC .............. Y10T 428/24711; B27N 5/00; B29K 2101/12; B29L 2031/448; B60N 3/001; B60N 3/002; B60N 3/004; A47G 11/006; A47G 11/004; A47B 3/0818; A47C 7/70; B61D 37/00
USPC ................... 248/903; 108/137, 143, 44, 42; 296/24.34
See application file for complete search history.

(56) References Cited

U.S. PATENT DOCUMENTS

| | | | |
|---|---|---|---|
| 3,567,067 A | | 3/1971 | Weiss et al. |
| 3,669,821 A | * | 6/1972 | Sharp ..................... B29C 53/24 |
| | | | 428/184 |
| 3,877,747 A | | 4/1975 | Brennan et al. |
| 4,944,552 A | | 7/1990 | Harris |
| 5,092,652 A | | 3/1992 | Macaluso |
| 5,443,018 A | | 8/1995 | Cromwell |
| 5,547,247 A | | 8/1996 | Dixon |
| 6,220,558 B1 | * | 4/2001 | Broder ............... A47B 21/0314 |
| | | | 108/57.25 |
| 7,506,923 B1 | * | 3/2009 | Gauss .................... B60N 3/002 |
| | | | 297/149 |
| 8,336,956 B2 | * | 12/2012 | Westerink .............. B64D 11/06 |
| | | | 108/44 |
| 8,336,957 B2 | | 12/2012 | Roy et al. |
| 8,616,137 B2 | | 12/2013 | Collins et al. |
| 9,278,469 B2 | | 3/2016 | Mahe |
| 9,546,019 B2 | | 1/2017 | Federl et al. |
| 2004/0142124 A1 | * | 7/2004 | Patterson ............. B65D 77/003 |
| | | | 428/34.1 |
| 2004/0163773 A1 | * | 8/2004 | Murray .................... E06B 9/08 |
| | | | 160/133 |
| 2006/0090409 A1 | * | 5/2006 | Allred, III ............ E04F 11/064 |
| | | | 52/182 |
| 2008/0252109 A1 | * | 10/2008 | Salzer .................... B60N 3/002 |
| | | | 297/173 |
| 2010/0090504 A1 | * | 4/2010 | Brink ..................... A47C 1/121 |
| | | | 297/162 |
| 2011/0148156 A1 | * | 6/2011 | Westerink .............. B64D 11/06 |
| | | | 297/162 |
| 2015/0068435 A1 | * | 3/2015 | Maslakow ......... B64D 11/0638 |
| | | | 108/42 |
| 2015/0130249 A1 | * | 5/2015 | Liew ...................... B64D 11/06 |
| | | | 297/411.2 |

FOREIGN PATENT DOCUMENTS

| | | | |
|---|---|---|---|
| DE | 3139222 | * | 3/1983 |
| DE | 19820732 C1 | | 9/1999 |
| EP | 1801008 | * | 6/2007 |
| EP | 2586586 A1 | | 5/2013 |
| EP | 2687128 | * | 1/2014 |
| EP | 2708468 | * | 3/2014 |
| FR | 2687980 A1 | | 9/1993 |
| FR | 2915960 | * | 11/2008 |
| GB | 2541660 | * | 3/2017 |
| JP | 2000158989 A | | 6/2000 |
| WO | 2006030228 A1 | | 3/2006 |
| WO | 2013030797 | * | 3/2013 |
| WO | 2014205032 | * | 12/2014 |
| WO | 2015155796 | * | 10/2015 |

OTHER PUBLICATIONS

French Patent No. 2687980; Date of Publication: Sep. 3, 1993; Abstract only; 1 page.
German Patent No. 19820732; Date of Publication: Sep. 2, 1999; Abstract only; 1 page.
International Search Report for International Application PCT/IB2015/056908; dated May 25, 2016; 8 pages.
Japanese Patent No. 2000158989; Date of Publication: Jun. 13, 2000; Abstract only; 2 pages.
Written Opinion of the International Search Report for International Application PCT/IB2015/056908; dated May 25, 2016; 11 pages.

* cited by examiner

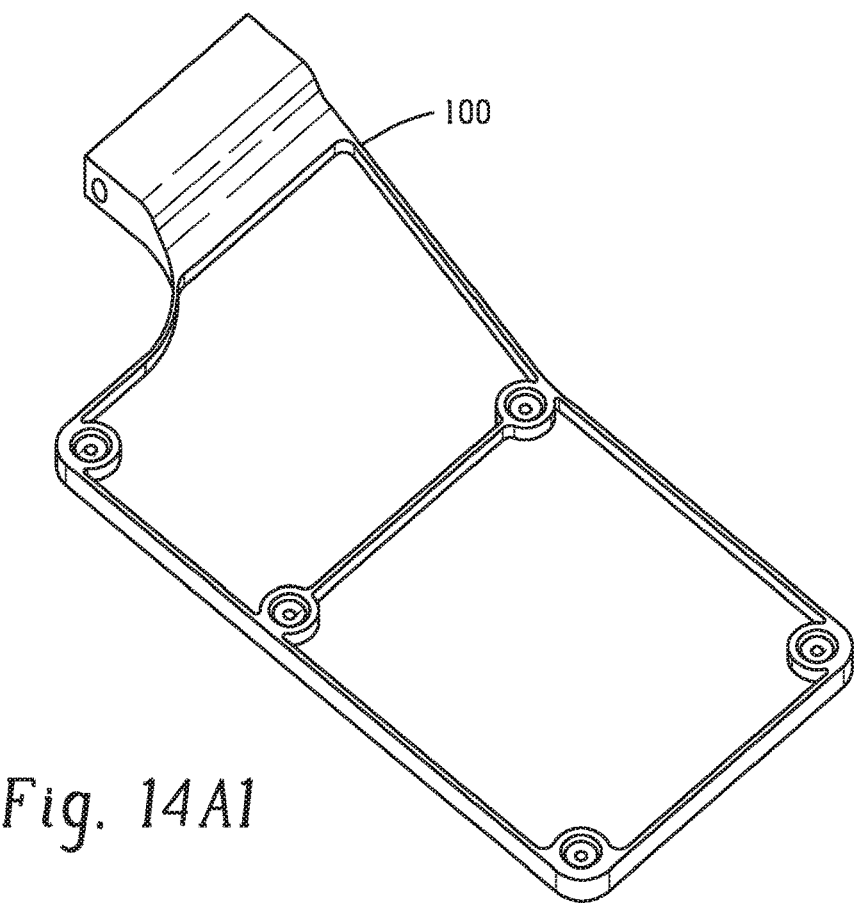
Fig. 14A1
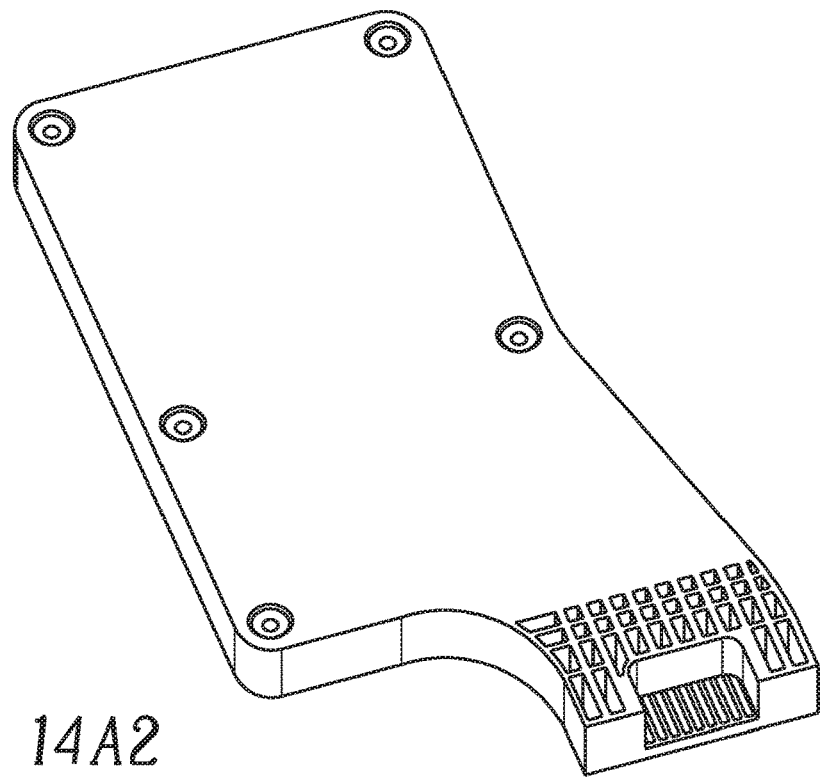
Fig. 14A2

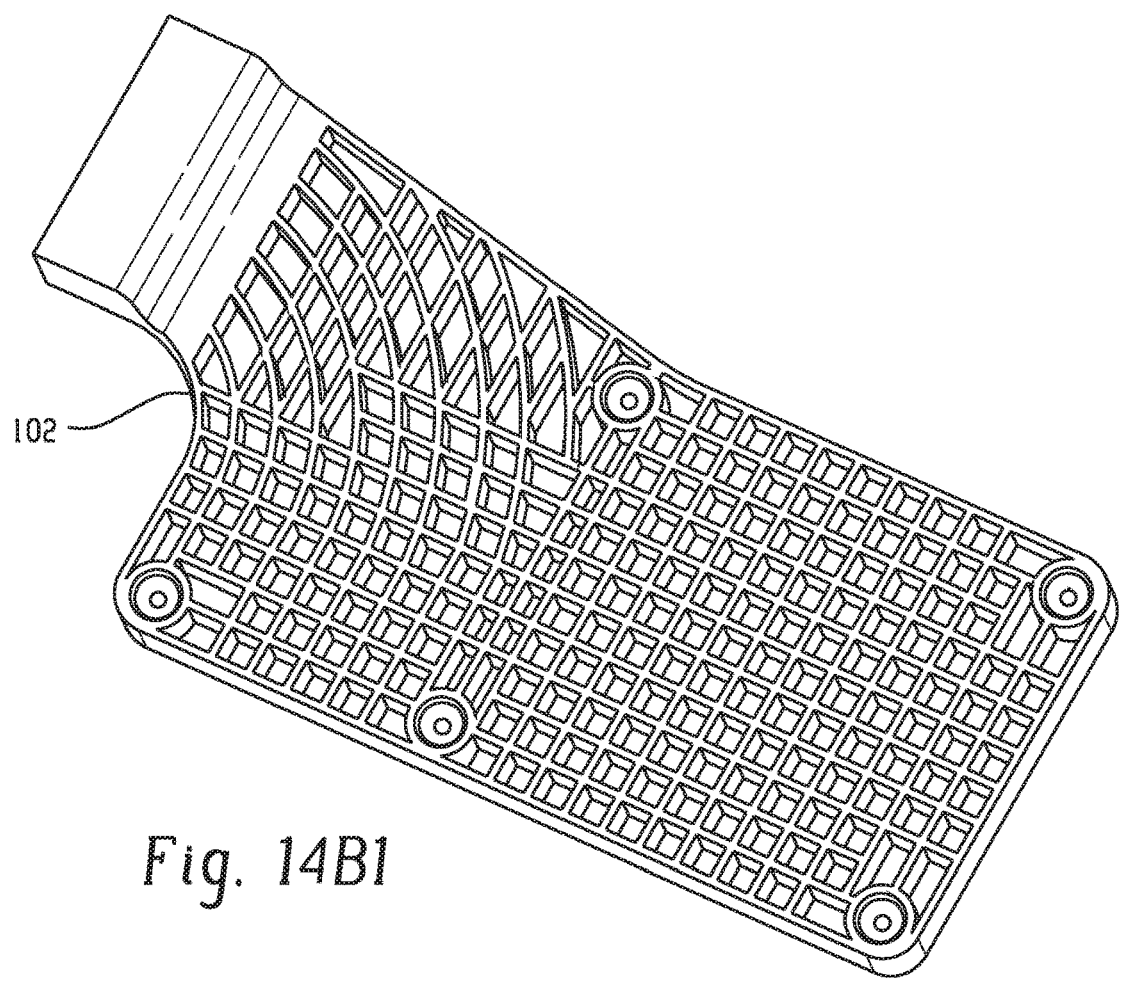
Fig. 14B1
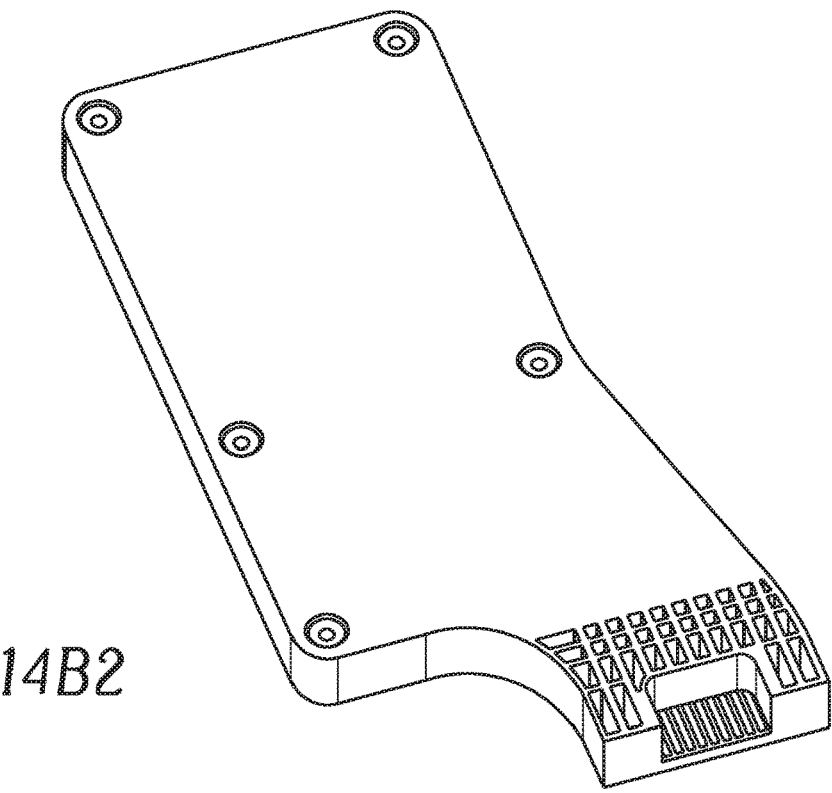
Fig. 14B2

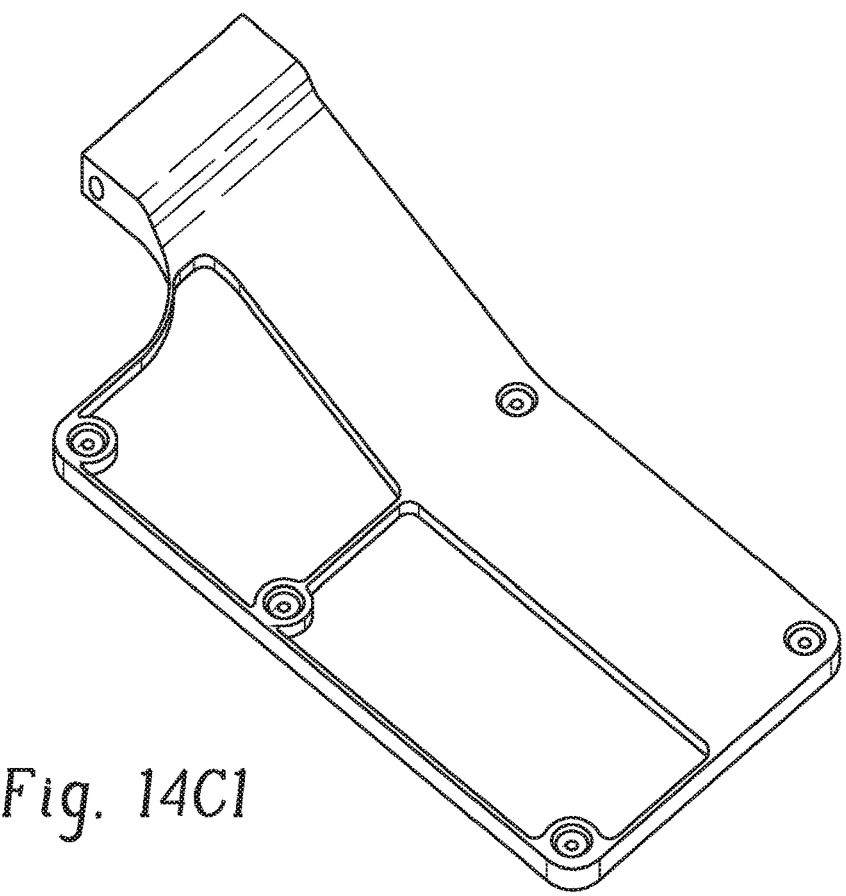
Fig. 14C1
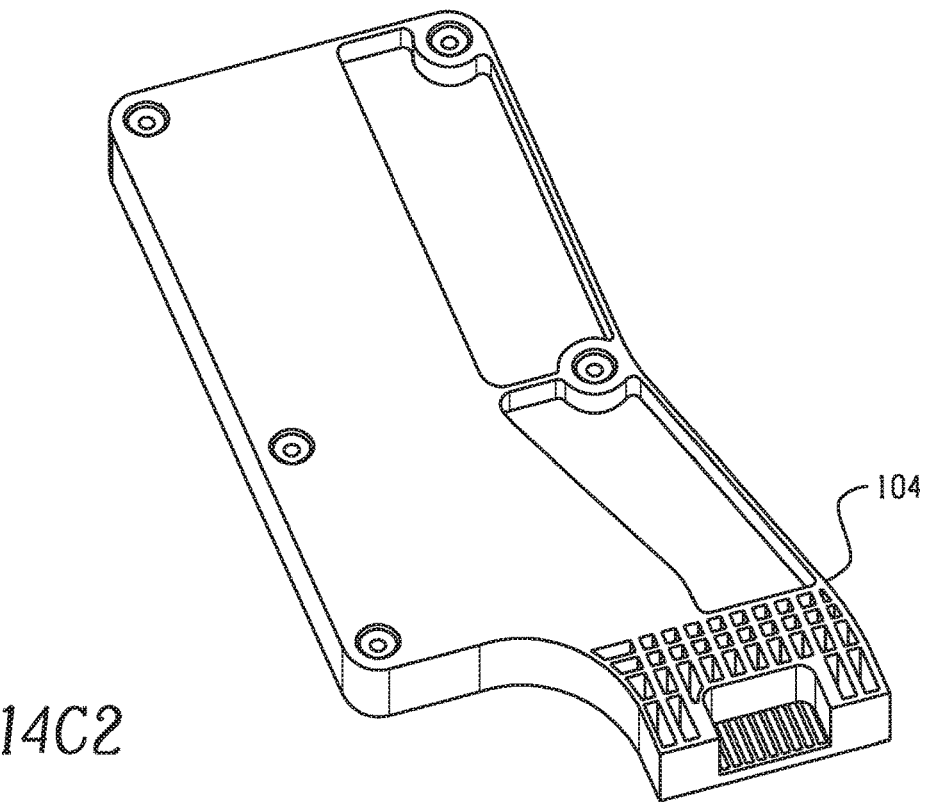
Fig. 14C2

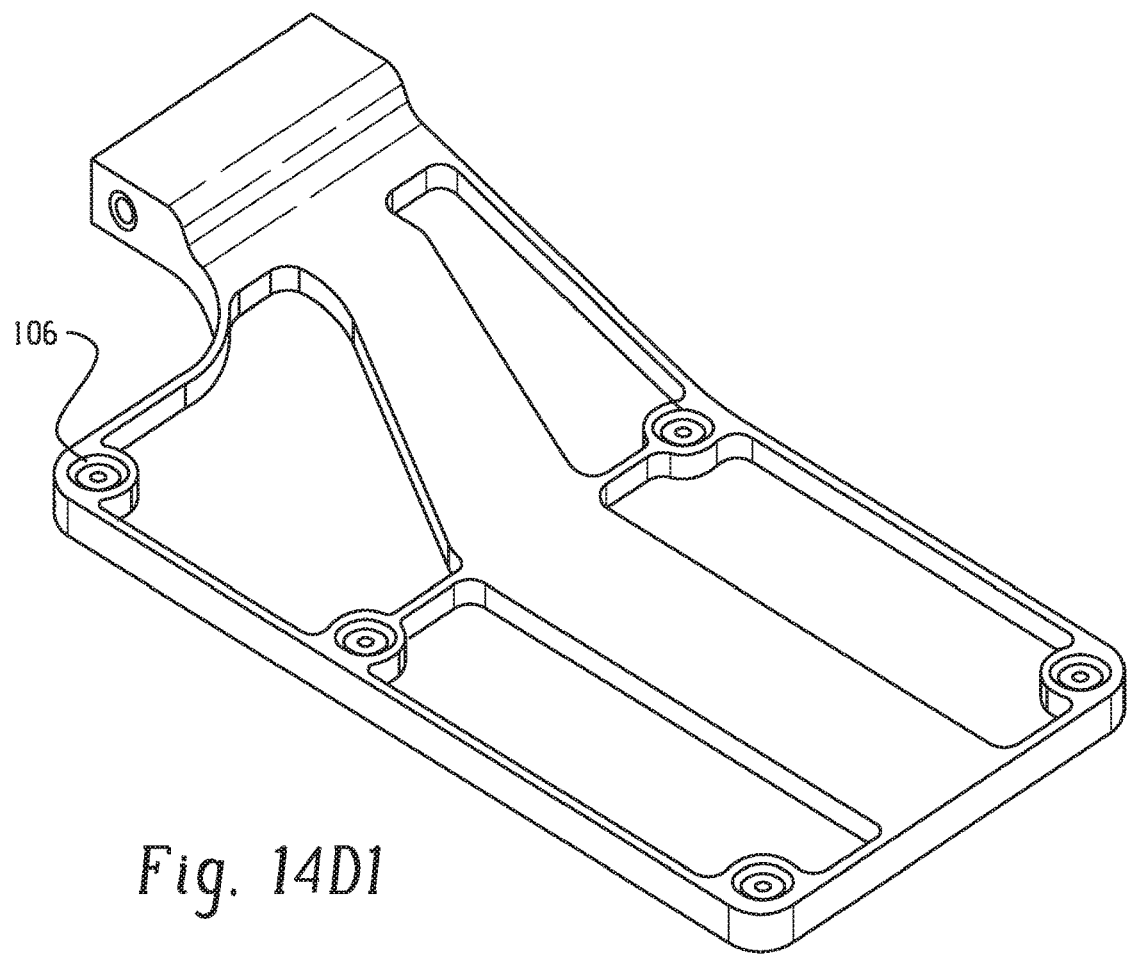
Fig. 14D1
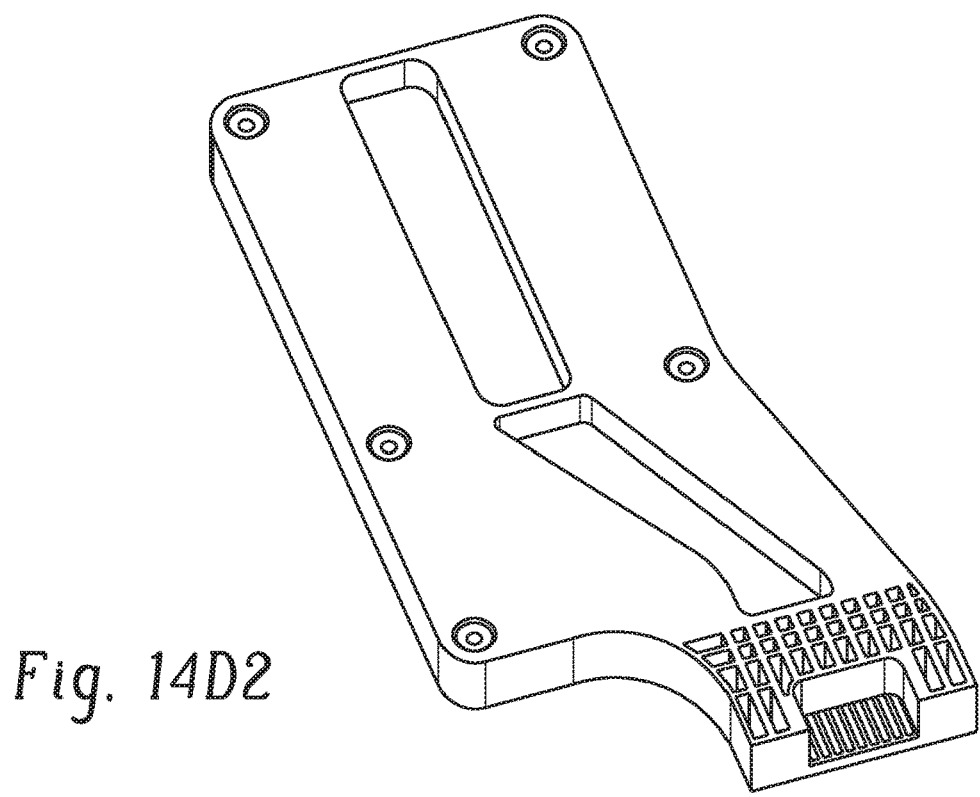
Fig. 14D2

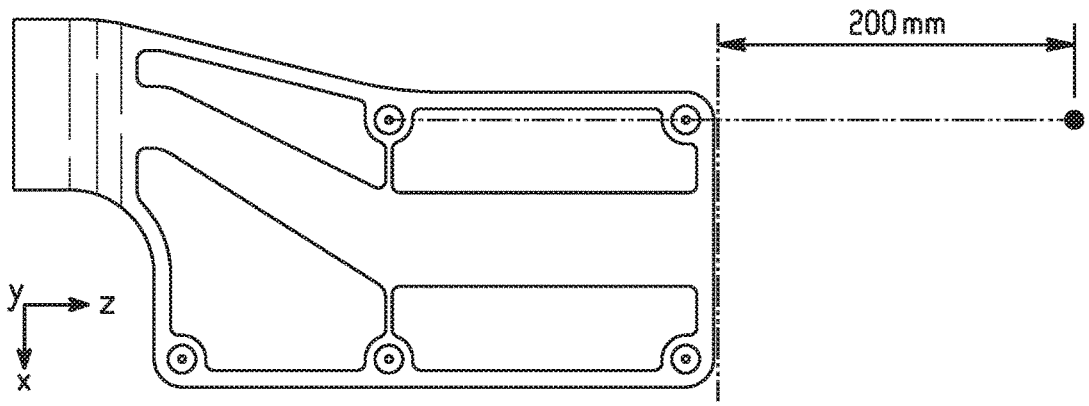
Fig. 15
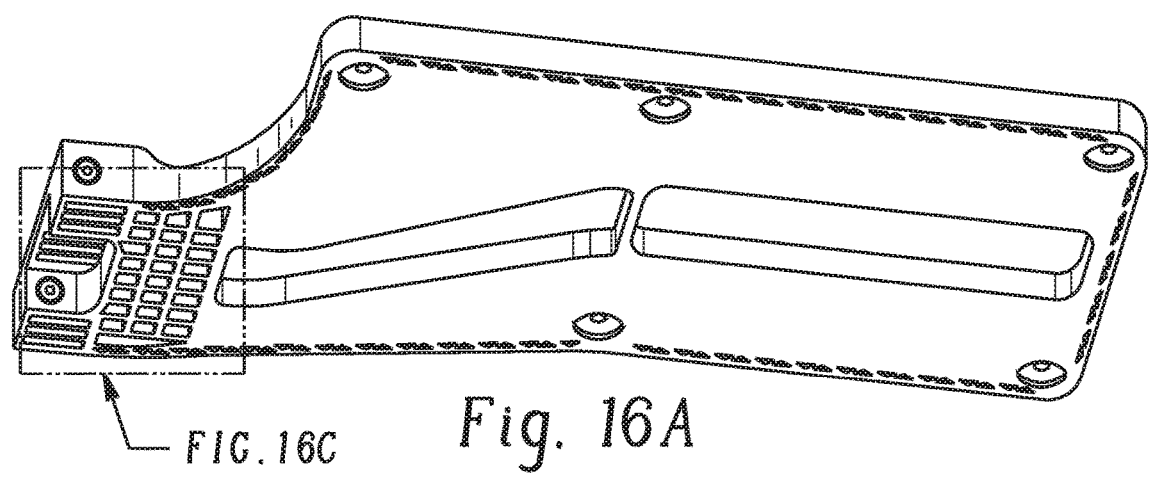
Fig. 16A
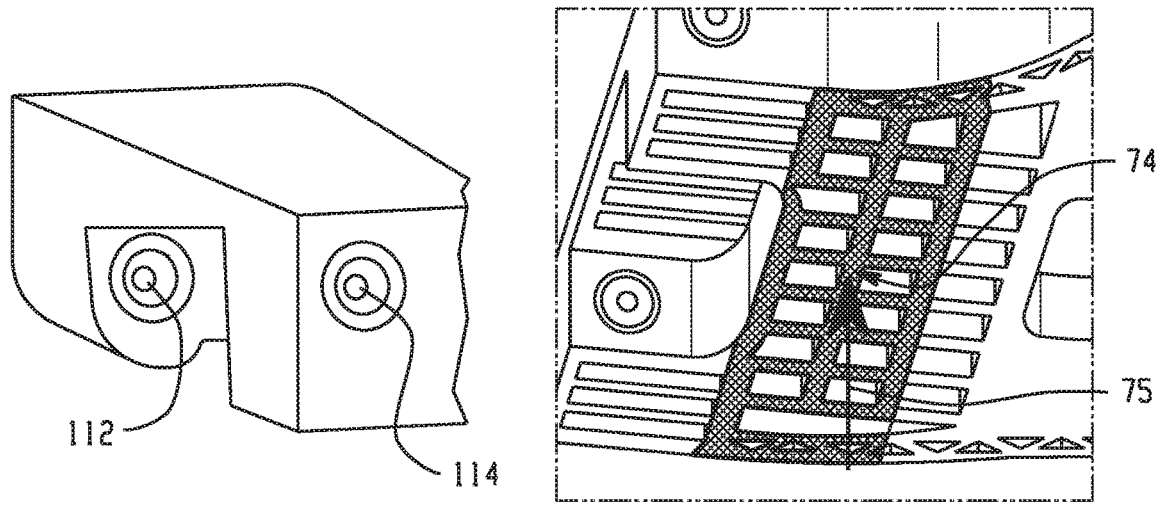
Fig. 16B
Fig. 16C

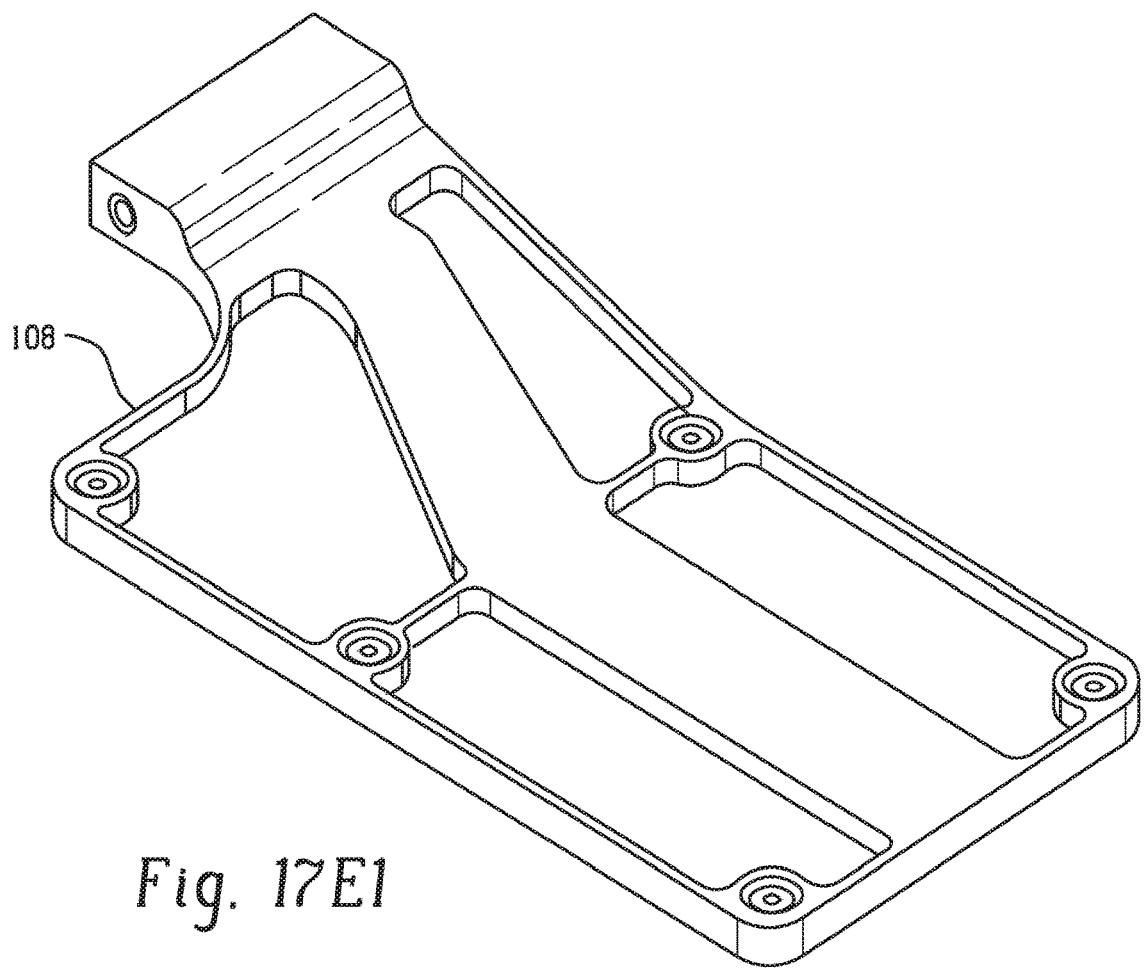
Fig. 17E1
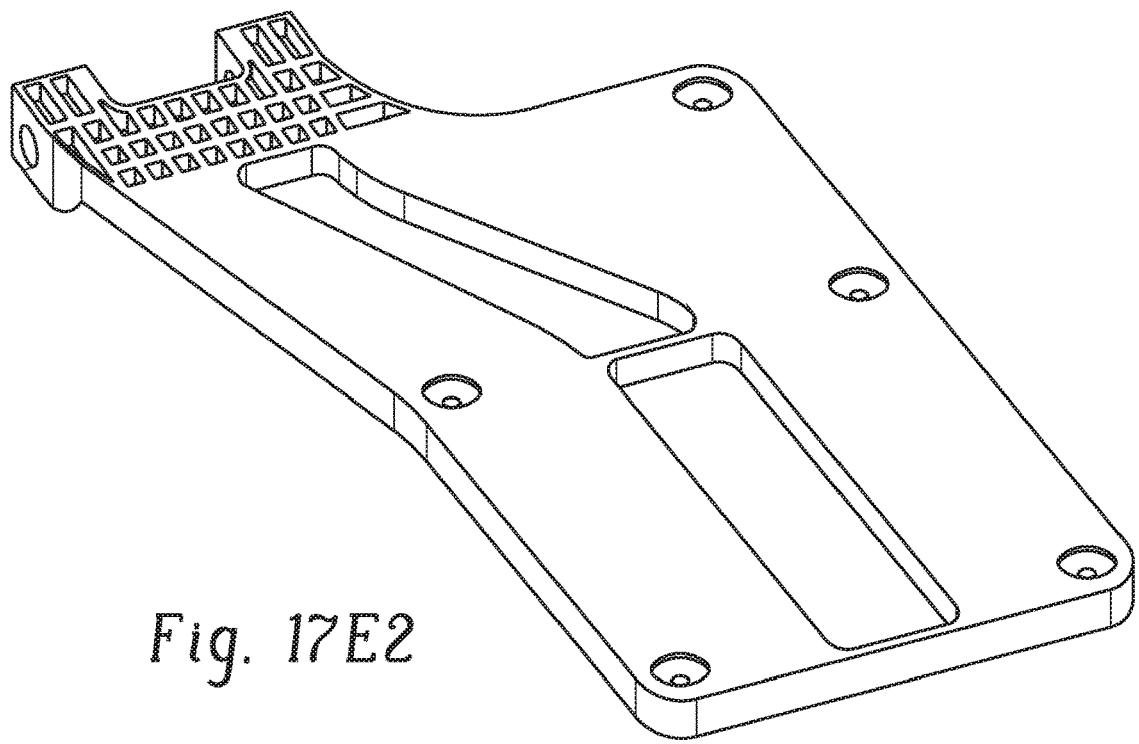
Fig. 17E2

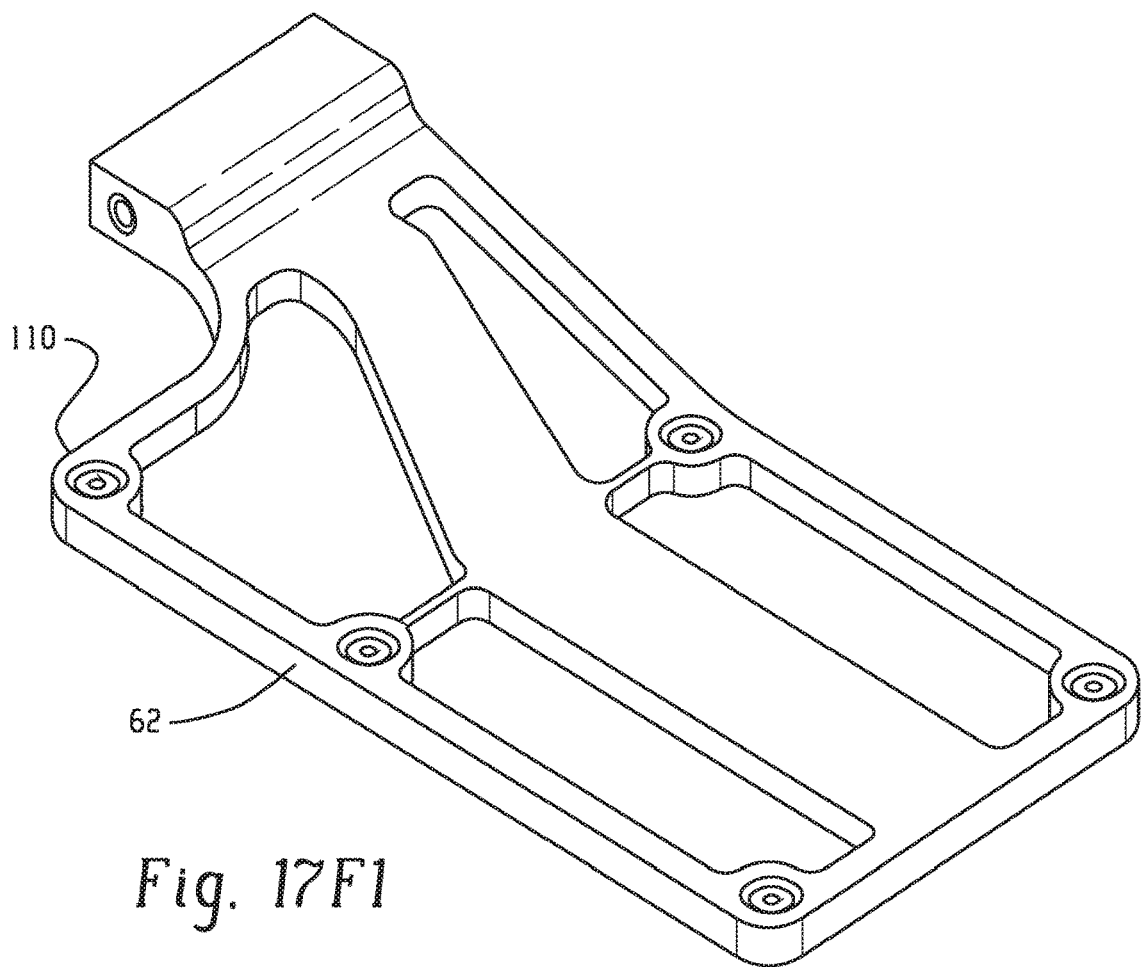
Fig. 17F1
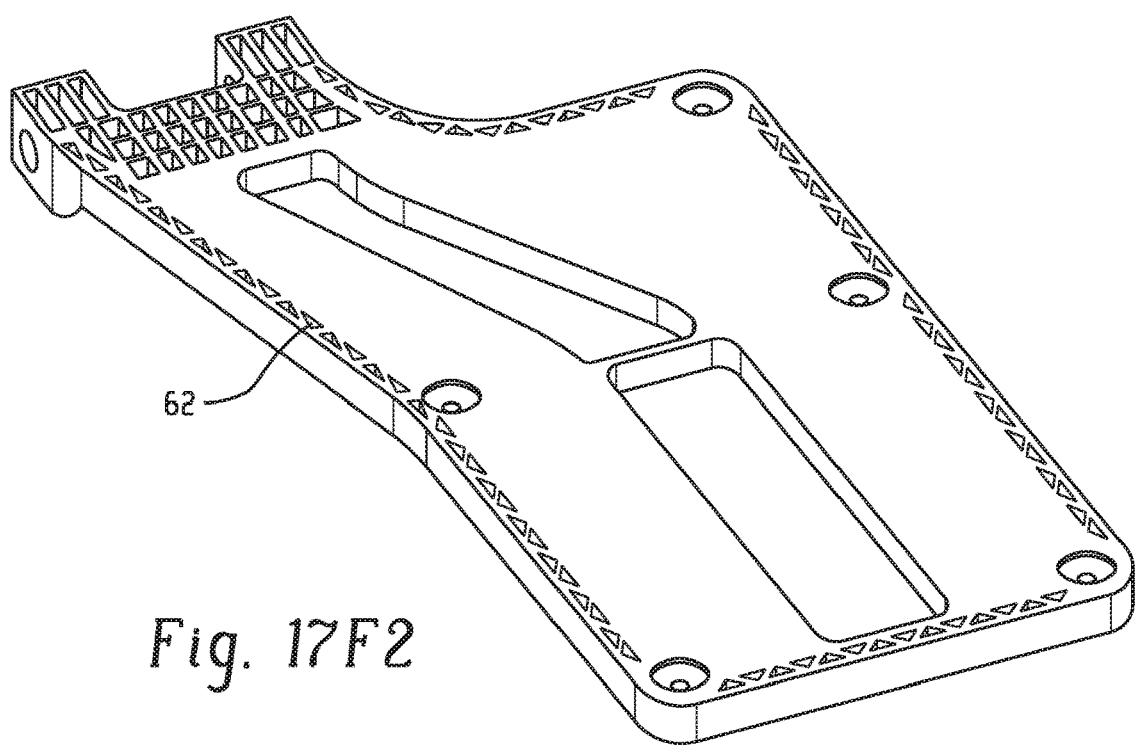
Fig. 17F2

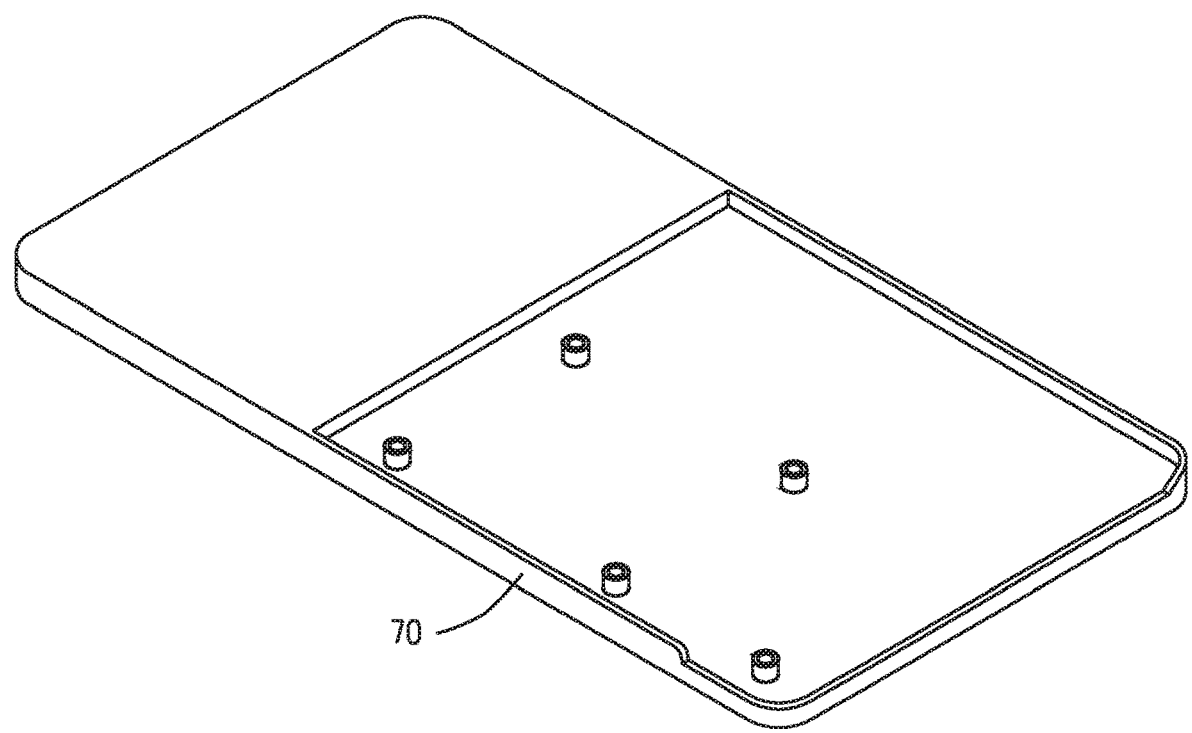
Fig. 18G1
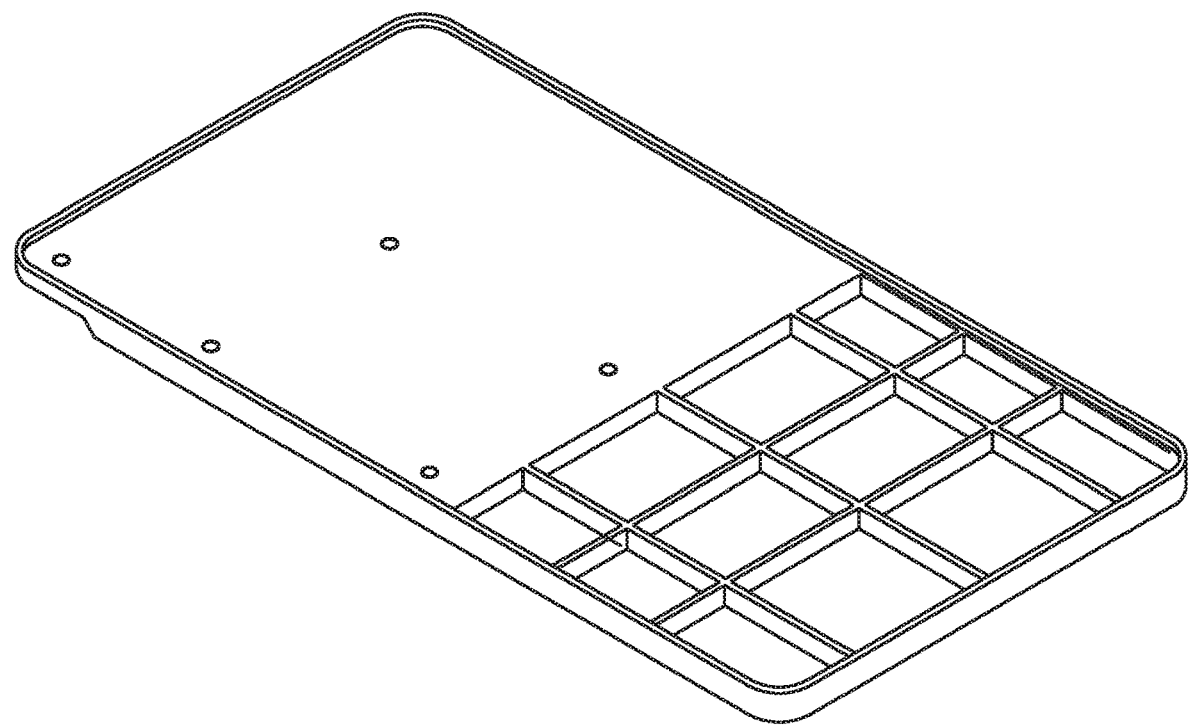
Fig. 18G2

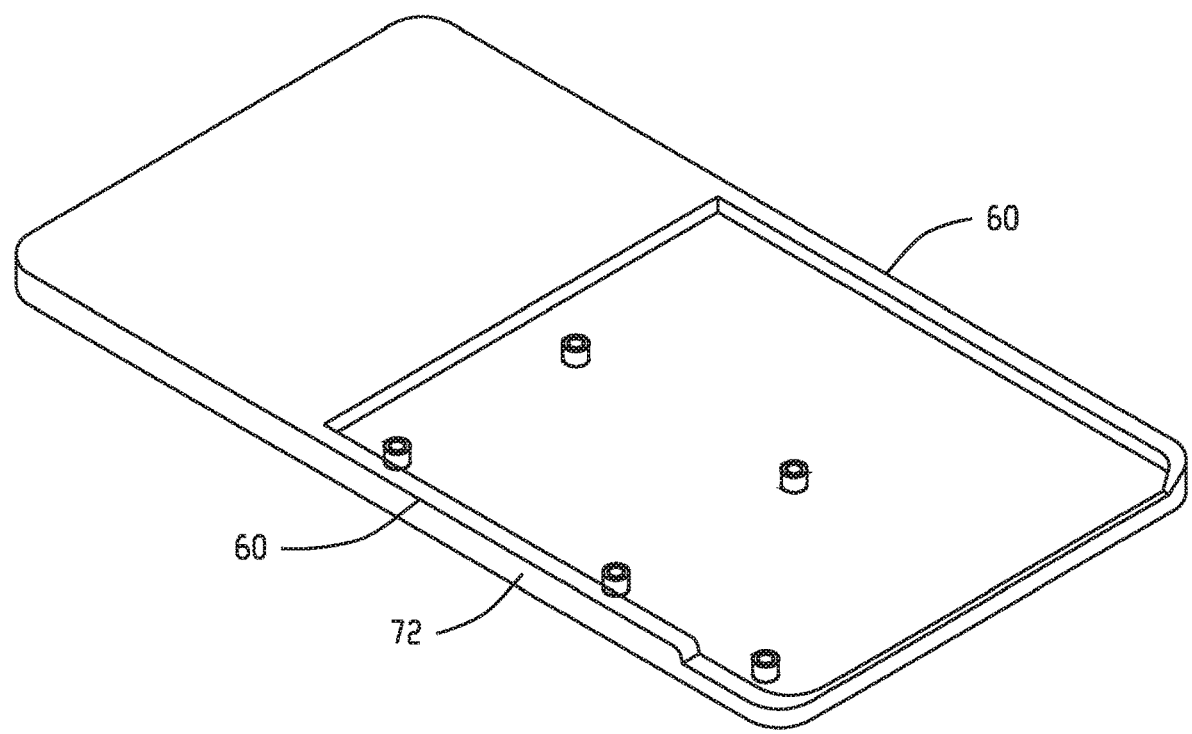
Fig. 18H1
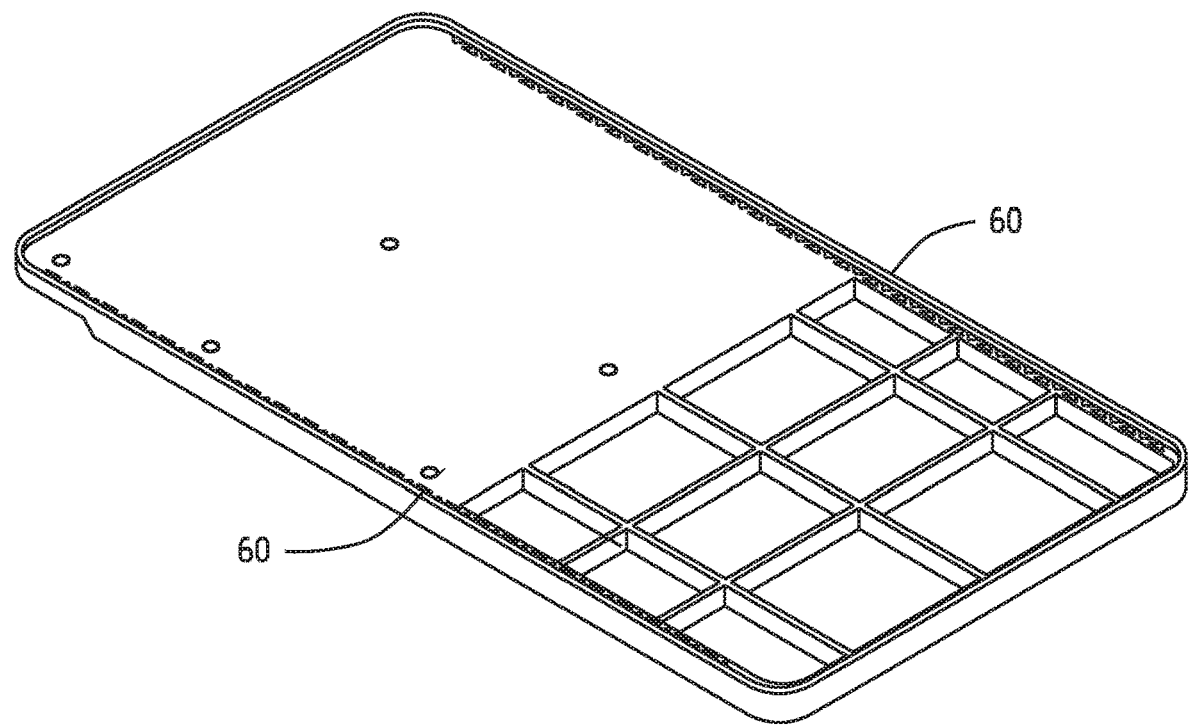
Fig. 18H2

POLYMERIC MASS TRANSIT TRAY TABLE ARM AND METHODS OF MAKING SAME

CROSS REFERENCE TO RELATED APPLICATIONS

This application is a 371 of International Application No. PCT/M2015/056908, filed Sep. 9, 2015, which claims priority to U.S. Application No. 62/049,024 filed Sep. 11, 2014, both of which are incorporated herein by reference in their entirety.

BACKGROUND

Tray tables can be used in vehicles such as airplanes, trains, helicopters, and buses. Tray tables can be stowed in the seatback of passenger seats in a stowed position and can be lowered into a deployed position during flight. Tray tables can be connected to one or more arms (e.g., support arms, tray table arms, etc.) that pivot from the seatback, such as down from the seatback, to a position in front of the passenger in the deployed position.

Support arms can be attached to the sides of the seat, substantially removed from the space occupied by the passenger(s), to support the tray table, such as about each of its ends. However, some seats, such as front-row seats, exit row seats, and other seats, such as those that do not have a seat positioned in front of them, may not accommodate such a construction. Accordingly, such seats can use a construction in which the tray table and any associated arms are located to a side of the seat. The tray table can be supported by a support arm on one side of the tray table. Some designs include a mechanism for moving the tray table and support arm from a position at the side of the passenger to a deployed position in front of the passenger. A positioning mechanism can enable movement of the tray table from the stowed position at the side of the seat to the deployed position. A positioning mechanism can enable movement of the tray table to allow a passenger exit their seat without having to stow an arm coupled to the tray table.

Tray table support arms can be made from metallic materials, such as aluminum, since aluminum has a lower weight as compared to other metals such as steel. However, metallic arms are machined and subject to other secondary operations, which add to manufacturing costs and time.

Weight reduction in aerospace components offers significant benefits in terms of cost reduction arising from fuel savings and/or increased range. There accordingly remains a need for a lighter weight support arm and tray table. Such an arm should not experience premature failure and should offer efficiencies in manufacturing cost and time.

SUMMARY

Disclosed herein are support arms, tray table assemblies, articles comprising the same, and methods of making the same.

A retractable hinged arm includes: an elongate, substantially planar body formed of a filled thermoplastic material, the body, in a deployed mode, having major faces facing upward and downward, with one of the faces defining an elongate central concavity extending substantially the length of the body, opening away from the body, and the other face defining lateral concavities extending substantially the length of the body disposed on each side of the central concavity, wherein the body has a cross-section, taken along a datum extending transverse the length of the body, defining an inner "U" shaped, corresponding to the central concavity, the inner "U" shaped portion sandwiched between outer "U" shaped portions disposed on each side of the inner "U" shape, each of the outer "U" shaped portions corresponding to a respective lateral concavity, with the inner "U" shaped portion's vertical portions comprising vertical portions of respective outer "U" shaped portions; a hinge disposed at a proximal portion of body; and a detent disposed proximal the hinge, the detent to arrest rotation of the body around the hinge; wherein, in the deployed mode, the body extends away from the hinge to support a weight at its distal portion.

A method of making a support arm includes: heating a mold to a glass transition temperature of a thermoplastic material; injecting the thermoplastic material comprising a filler into the mold and allowing the thermoplastic material to conform to the mold; cooling the mold to an ejection temperature to form the support arm; and ejecting the support arm from the mold; wherein a cross-section of the support arm taken along a line from an inner edge to an outer edge of the support arm comprises a first "U" shaped portion and a second "U" shaped portion.

A tray table assembly includes: a support arm comprising a material selected from metallic material, metallic alloy material, or a thermoplastic material, wherein a cross-section of the support arm taken along a line from an inner edge to an outer edge of the support arm comprises a first "U" shaped portion and a second "U" shaped portion joined by a connecting member; a tray table; wherein a perimeter of the support arm comprises a multiwall structure or wherein a perimeter of the tray table comprises a multiwall structure or wherein a perimeter of the support arm and a perimeter of the tray table comprises a multiwall structure.

The above described and other features are exemplified by the following figures and detailed description.

BRIEF DESCRIPTION OF THE DRAWINGS

Refer now to the figures, which are exemplary embodiments, and wherein like elements are numbered alike and which are presented for the purposes of illustrating the exemplary embodiments disclosed herein and not for the purposes of limiting the same.

FIG. 14A1 is a view of a front of a support arm;

FIG. 14A2 is a view of a back of the support arm of FIG. 14A1;

FIG. 14B1 is a view of a front of a support arm;
FIG. 14B2 is a view of a back of the support arm of FIG. 14B1;
FIG. 14C1 is a view of a front of a support arm;
FIG. 14C2 is a view of a back of the support arm of FIG. 14C1;
FIG. 14D1 is a view of a front of a support arm;
FIG. 14D2 is a view of a back of the support arm of 14D1;
FIG. 15 is an illustration of the loading for the various designs in FIG. 14;
FIG. 16A is an illustration of the boundary conditions for virtual testing conducted on the designs in FIG. 14A1-FIG. 14D2;
FIG. 16B is an illustration of the boundary condition points for the virtual testing conducted on the designs in FIG. 14A1-FIG. 14D2;
FIG. 16C is a detailed view of a portion of the boundary conditions taken from FIG. 16A illustrating the force location.
FIGS. 17E1, 17E2, 17F1, and 17F2 are illustrations of different designs of a support arm;
FIGS. 18G1, 18G2, 18H1, and 18H2 are illustrations of different designs of a tray table.

DETAILED DESCRIPTION

Figure 1:
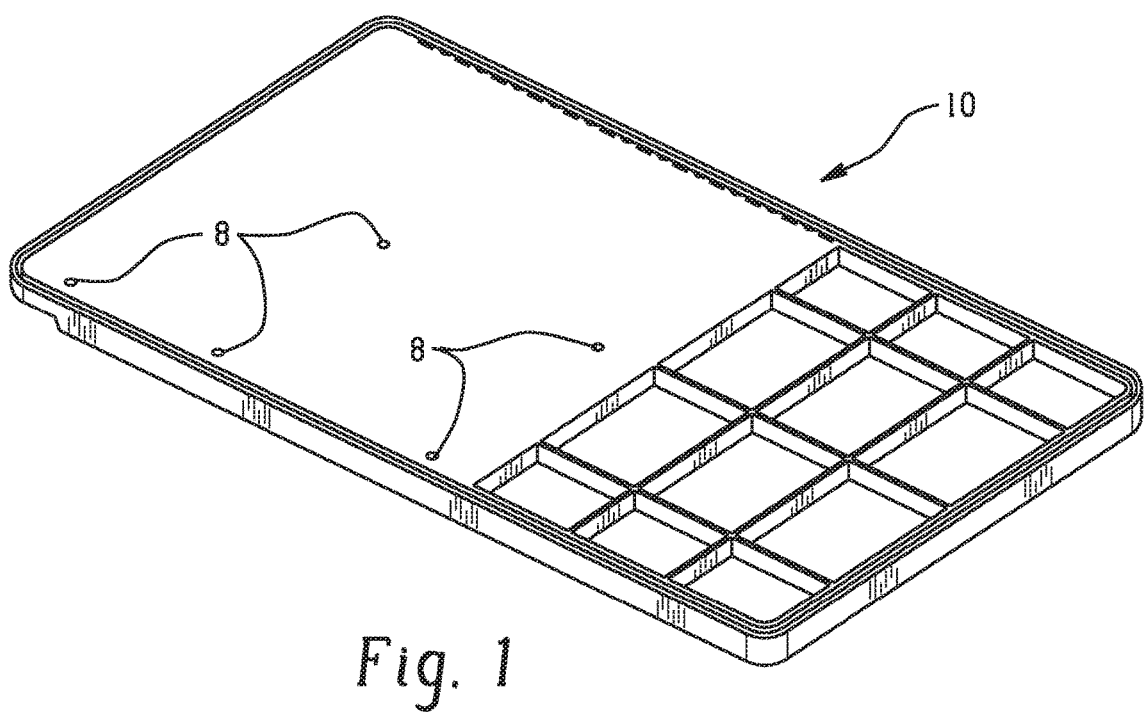
FIG. 1 is an illustration of a tray table.

Disclosed herein are support arms, also referred to herein as hinged arm, and tray table assemblies. The support arms and tray table assemblies can include a "U" shaped portion at an end thereof to provide additional structural integrity to the support arm or to the tray table. For example, a cross-section of the support arm taken along a line from an inner edge to an outer edge of the support arm can comprise a first "U" shaped portion and an optional second "U" shaped portion with an inner "U" shaped portion disposed therebetween. Stated another way, the retractable hinged arm can include a planar body, wherein the a cross-section of the body taken along a datum extending traverse the length of the body can form an inner "U" shaped portion, wherein the inner "U" shaped portion can be sandwiched between outer "U" shaped portions disposed on either or both sides of the inner "U" shaped portion. The "U" shaped portions can add structural integrity to the support arm, increasing the amount of load that can be placed upon the tray table assembly before undesirable displacement and/or failure of the part occurs. Extending horizontally from a leg of the first "U" shaped portion can be a member, also referred to herein as a lateral concavity, having a projection where the projection can extend vertically in the same direction as the leg. A structure can extend from the second "U" shaped portion. For example, extending horizontally from a post of the second "U" shaped portion can be a ledge, also referred to herein as a lateral concavity, having a jut extending vertically in the same direction as the post. A connecting member, also referred to herein as a central concavity, can be disposed between the first "U" shaped portion and the second "U" shaped portion, specifically, the connecting member can be disposed between the projection of the first "U" shaped portion and the jut of the second "U" shaped section. Stated another way, the central concavity. The body of the retractable hinged arm can include a substantially planar body optionally formed of a filled thermoplastic material. The body can include major faces facing upward and downward, where one of the faces can form the central concavity, e.g., an elongate central concavity, that can extend substantially the length of the body. The central concavity can open away from the body. The other face can include lateral concavities that can extend substantially the length of the body wherein the lateral concavities can be disposed one each side of the central concavity. The retractable hinged arm can include a hinge disposed at a proximal portion of the body and a detent disposed proximal to the hinge, wherein the detent can arrest rotation of the around the hinge. When in a deployed mode, the body can extend away from the hinge to support a weight at its distal portion.

Optionally, the support arm can include a multiwall structure. Optionally, the tray table can include a multiwall structure. Ribs can optionally be present dispersed between walls in the multiwall structure. The number of walls in the multiwall structure can be greater than or equal to 2. The number of "U" shaped portions present in the support arm or in the tray table can be greater than or equal to 1.

The support arm and tray table assembly can comprise a thermoplastic material. The support arm disclosed herein can comprise a thermoplastic material. The support arm disclosed herein can comprise a thermoplastic material and a filler. The support arm can comprise a material selected from a metallic material, a metallic alloy material, a thermoplastic material, or a combination comprising at least one of the foregoing. The tray table assembly can comprise a material selected from a metallic material, a metallic alloy material, a thermoplastic material, or a combination comprising at least one of the foregoing. The thermoplastic material, when used for either the support arm or tray table, can optionally include a filler. When made from a thermoplastic material, the support arm can have a lower mass when compared to contemporary, non-thermoplastic designs. When made from a thermoplastic material, the tray table can have a lower mass when compared to contemporary non-thermoplastic designs. The support arm and tray tables can have sufficient strength to be used in transportation applications where metal materials have generally been used. Favorable parameters disclosed herein, i.e., low mass, high strength tray tables and arms, can be achieved through the use of any one of or any combination thereof of engineering thermoplastics, additive manufacturing, and injection molding. Favorable displacement and stress values disclosed herein can be achieved. Lower mass, as disclosed herein, can provide cost savings as compared to other support arms, such as metallic support arms. It is to be understood, however, that the support arms and tray table assemblies disclosed herein can include metallic materials, metallic alloys, ceramic materials, thermoset materials, etc., so long as the material provides the desired characteristics for the support arms and tray table assemblies.

Support arms for tray tables on airplanes can be made of aluminum. Aluminum has a lower weight and a lower density than steel. Attempts to reduce the weight of tray table support arms in order to achieve a cost reduction arising from fuel savings has resulted in attempts to utilize lighter weight thermoplastic materials in place of aluminum. Accordingly, the present thermoplastic tray table and support arms can sustain heavy loads (e.g., greater than or equal to 680 Newtons (N)). This load can be applied at an increased load region in the tray table, such as where the load is increased due to the possibility of a large distance from the support point (e.g., large moment arm). Ribs or increased thickness alone can be insufficient, at least because such techniques use additional material thereby adding to the overall weight of the support arm and/or tray table.

The support arm can comprise a polymer such as a thermoplastic material, or a combination of thermoplastic and thermoset materials. The thermoplastic material can comprise a polycarbonate, a polyester (such as poly(ethylene terephthalate), poly(butylene terephthalate), and poly (lactic acid)), a polyamide (such as aliphatic polyamides including nylon 6, semi-aromatic polyphthalamides, and aromatic polyamides), a polyimide (such as polyetherimide), a polyketone (such as poly(ether ether ketone) (PEEK), poly(ether ketone), and poly(aryl ether ketone)), a polysulfide (such as poly(phenylene sulfide)), a polysulfone (such as poly(ether sulfone)), a polyacrylate (such as poly(methyl methacrylate)), a polyacetal (such as poly(oxymethylene)), a polyacetate (such as poly(vinyl acetate)), a fluoro plastic (such as polytetrafluoroethylene), a chloro plastic (such as poly(vinyl chloride) and poly(vinylidene chloride)), a polyethylene (such as high density polyethylene, low density polyethylene, and ultra-high molecular weight polyethylene), a polyurethane, polypropylene, an acrylonitrile butadiene styrene (ABS) copolymer, a styrene acrylonitrile (SAN) copolymer, polyphenylene, polyvinyl alcohol, polystyrene, polycaprolactone, polybutylene, polybutadiene, a copolymer comprising at least one or more of the foregoing or a blend comprising at least one or more of the foregoing. For example, the thermoplastic material can comprise a polycarbonate/ABS blend (CYCOLOY™ resins commercially available from SABIC's Innovative Plastics business), a copolycarbonate-polyester, acrylic-styrene-acrylonitrile (ASA) (GELOY™ resins commercially available from SABIC's Innovative Plastics business), a blend of polyphenylene ether/polyamide (NORYL GTX™ resins from SABIC's Innovative Plastics business), a blend of polycarbonate/polyethylene terephthalate (PET)/polybutylene terephthalate (PBT), polybutylene terephthalate and impact modifier (XENOY™ resins commercially available from SABIC' s Innovative Plastics business), polycarbonate (LEXAN™ and LEXAN™ EXL resins commercially available from SABIC's Innovative Plastics business), poly(methyl)meth acrylate (PMMA) capped polycarbonate, polyetherimide (ULTEM™ polyetherimide resin (e.g., EC006PXQ™ and/or EC008PXQ™) or SILTEM™, both commercially available SABIC's Innovative Plastics business).

The support arm can comprise a flame retardant additive, such as SILTEM™, commercially available from SABIC's Innovative Plastics business.

The support arm can optionally comprise a filler. Non-limiting examples of fillers include silica powder, such as fused silica, crystalline silica, natural silica sand, and various silane-coated silicas; boron-nitride powder and boron-silicate powders; alumina and magnesium oxide (or magnesia); wollastonite including surface-treated wollastonite; calcium sulfate (as, for example, its anhydride, dihydrate or trihydrate); calcium carbonates including chalk, limestone, marble and synthetic, precipitated calcium carbonates, generally in the form of a ground particulate which often comprises 98+% $CaCO_3$ with the remainder being other inorganics such as magnesium carbonate, iron oxide and alumino-silicates; surface-treated calcium carbonates; talc, including fibrous, modular, needle shaped, and lamellar talcs; glass spheres, both hollow and solid, and surface-treated glass spheres typically having coupling agents such as silane coupling agents and/or containing a conductive coating; kaolin, including hard, soft, calcined kaolin, and kaolin comprising various coatings known in the art to facilitate the dispersion in and compatibility with the thermoset resin; mica, including metallized mica and mica surface treated with amino silanes or acryloylsilanes coatings to impart good physicals to compounded blends; feldspar and nepheline syenite; silicate spheres; flue dust; cenospheres; fillite; aluminosilicate (armospheres), including silanized and metallized aluminosilicate; quartz; quartzite; perlite; tripoli; diatomaceous earth; silicon carbide; molybdenum sulfide; zinc sulfide; aluminum silicate (mullite); synthetic calcium silicate; zirconium silicate; barium titanate; barium ferrite; barium sulfate and heavy spar; particulate or fibrous aluminum, bronze, zinc, copper and nickel; carbon black, including conductive carbon black; and graphite, such as graphite powder.

The filler can have an aspect ratio other than 1:1, e.g., greater than 1. Such fillers can exist in the form of flakes, whiskers, fibers, needles, rods, tubes, strands, elongated platelets, lamellar platelets, ellipsoids, micro fibers, nanofibers, nanotubes, elongated fullerenes, and the like. Where such fillers exist in aggregate form, an aggregate having an aspect ratio greater than 1 will also suffice. Examples of such fillers well known in the art include those described in "Plastic Additives Handbook, 5th Edition" Hans Zweifel, Ed, Carl Hanser Verlag Publishers, Munich, 2001, the contents of which are incorporated by reference herein.

Non-limiting examples of flakes having an aspect ratio greater than 1 include glass flakes, flaked silicon carbide, aluminum diboride, aluminum flakes, and steel flakes. Non-limiting examples of fibrous fillers include processed mineral fibers such as those derived from blends comprising at least one of aluminum silicates, aluminum oxides, magnesium oxides, calcium sulfate hemihydrate, boron fibers, ceramic fibers such as silicon carbide, and fibers from mixed oxides of aluminum, boron, and silicon sold under the trade name NEXTEL™ by 3M Co., St. Paul, Minn., USA; and natural fibers including wood flour, cellulose, cotton, sisal, jute, starch, cork flour, lignin, ground nut shells, corn, rice grain husks, cloth, hemp cloth, felt, and natural cellulosic fabrics such as Kraft paper, cotton paper, and glass fiber containing paper. Synthetic reinforcing fibers can be used provided the glass transition temperature of the synthetic fiber is greater than that of the thermoplastic material. Suitable synthetic fibers include polyester fibers such as poly(ethylene terephthalate) and poly(butylene terephthalate), poly(vinyl alcohol) fibers, polyarylates, polyethylene, aromatic polyamide fibers, polybenzimidazole fibers, poly (phenylene sulfide) fibers, poly(ether ether ketone) fibers, polytetrafluoroethylene fibers, acrylic resin fibers, high tenacity fibers with high thermal stability including aromatic polyamides, polyaramid fibers such as Kevlar (product of Du Pont), polyimide fibers such as polyimide 2080 and PBZ fiber (both products of Dow Chemical Company) and polyetherimide fibers; poly(ether ether ketone) fibers, polybenzoxazole fibers, and the like. Fibrous fillers such as basalt fibers, including textile glass fibers and quartz are also considered.

The filler can comprise glass fibers. Useful glass fibers can be formed from any type of fiberizable glass composition known to those skilled in the art, and include those prepared from fiberizable glass compositions commonly known as "E-glass," "A-glass," "C-glass," "D-glass," "R-glass," "S-glass," as well as E-glass derivatives that are fluorine-free and/or boron-free. Such compositions and methods of making glass filaments therefrom are well known to those skilled in the art and a more detailed description is not necessary.

The filler can comprise a carbon fiber. The carbon fibers can have an average diameter of 3.5 nanometers to 5 micrometers. The carbon fibers can have an average diameter of 4 to 100 nanometers. The carbon fibers can have an average diameter of 5 to 10 nanometers. The carbon fibers can be vapor-grown carbon fibers. The carbon fiber can comprise carbon nanotubes. The carbon nanotubes can have a length to diameter ratio of up to 132,000,000:1. The carbon nanotubes can comprise single walled nanotubes and/or multi-walled nanotubes.

The filler can be used with various coatings, including, for example, metallic coatings and silane coating.

In general the amount of optional fibrous filler present in the thermoplastic composition can be up to 70 weight percent (wt %) (e.g., greater than 0 to 70 wt %) based on the total weight of the composition, specifically 10 to 60 wt %, and more specifically, 20 to 50 wt % thereof.

The support arm and/or tray table can have flame retardant properties such that each is compliant with the Federal Aviation Regulation (FAR). The support arm can meet one or more of the FAR requirements for low heat low smoke density, and low toxic combustion by-products. Specifically, the support arm can have one or more of a peak heat release of less than 65 kiloWatts per square meter ($kW/m^2$), as measured by FAR 25.853 (OSU test); a total heat release at 2 minutes of less than or equal to 65 kiloWatt-minutes per square meter ($kW*min/m^2$) as measured by FAR 25.853 (OSU test); and an NBS optical smoke density of less than 200 when measured at 4 minutes, based on ASTM E-662 (FAR/JAR 25.853).

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 2:
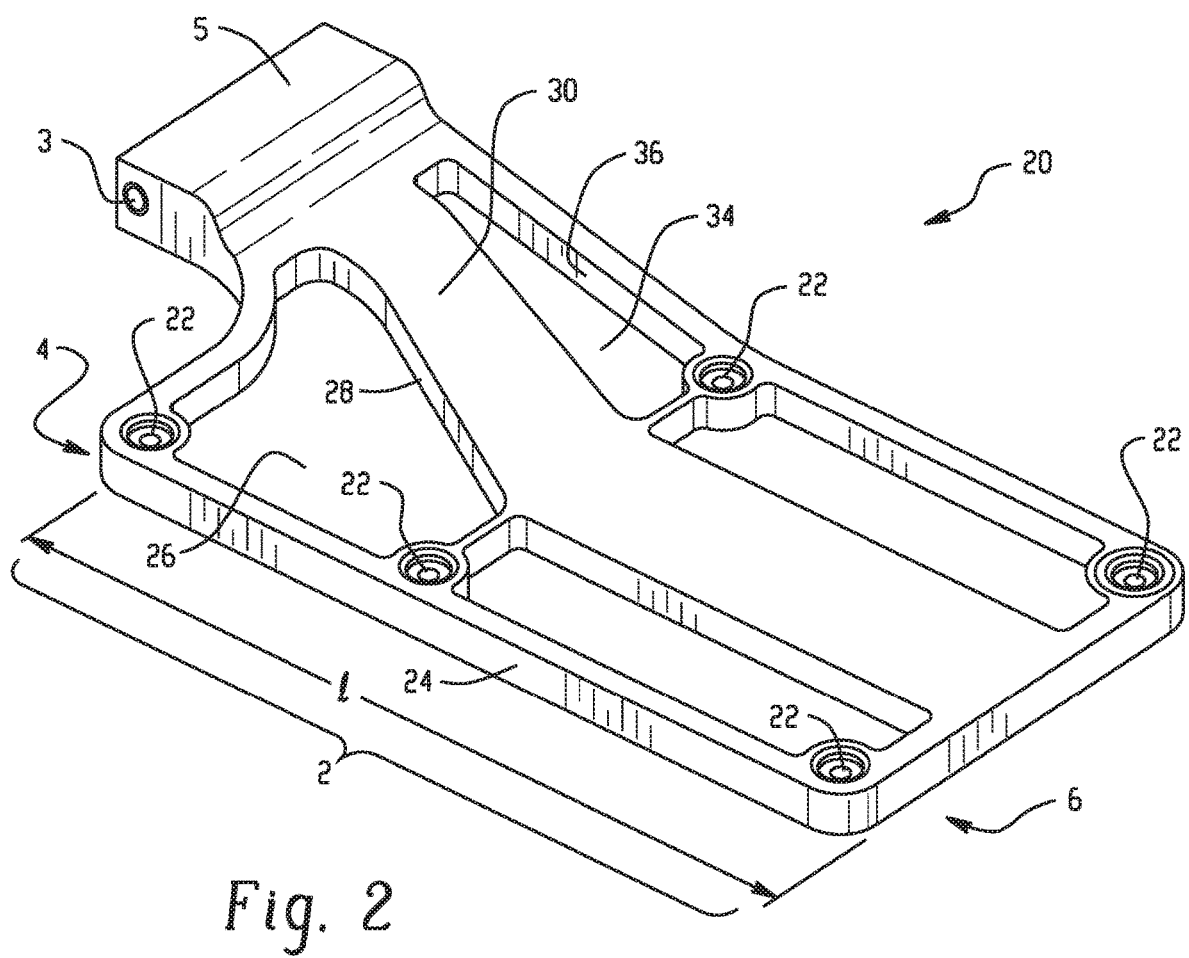
FIG. 2 is an isometric illustration of a support arm.
Figure 3:
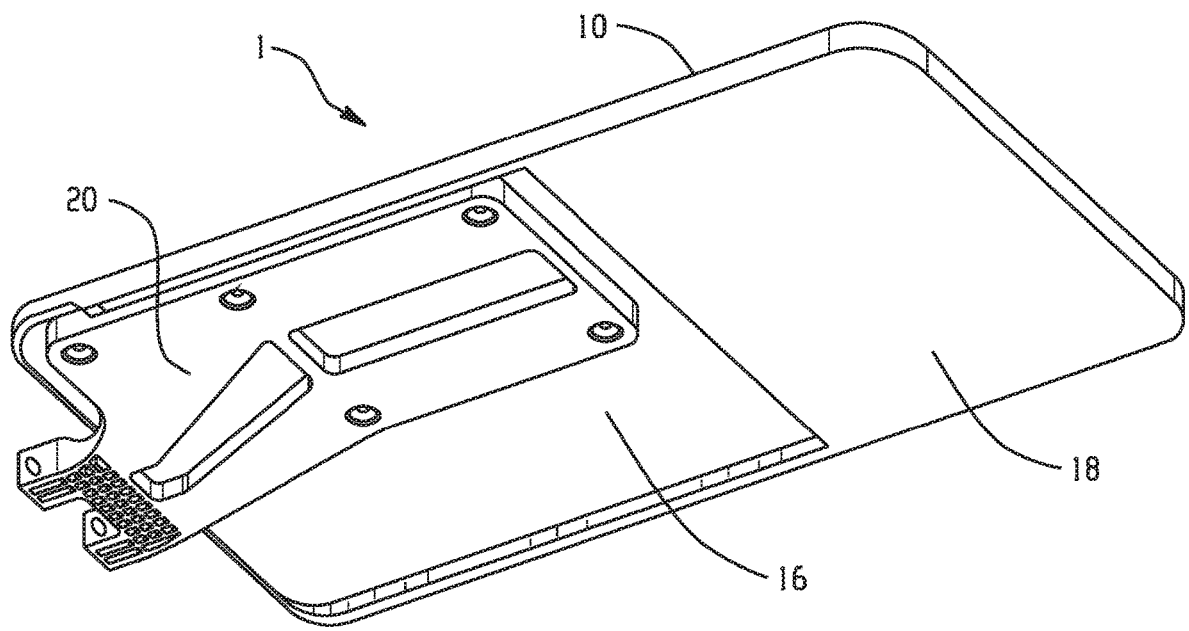
FIG. 3 is an isometric illustration of a bottom view of a tray table assembly.
Figure 4:
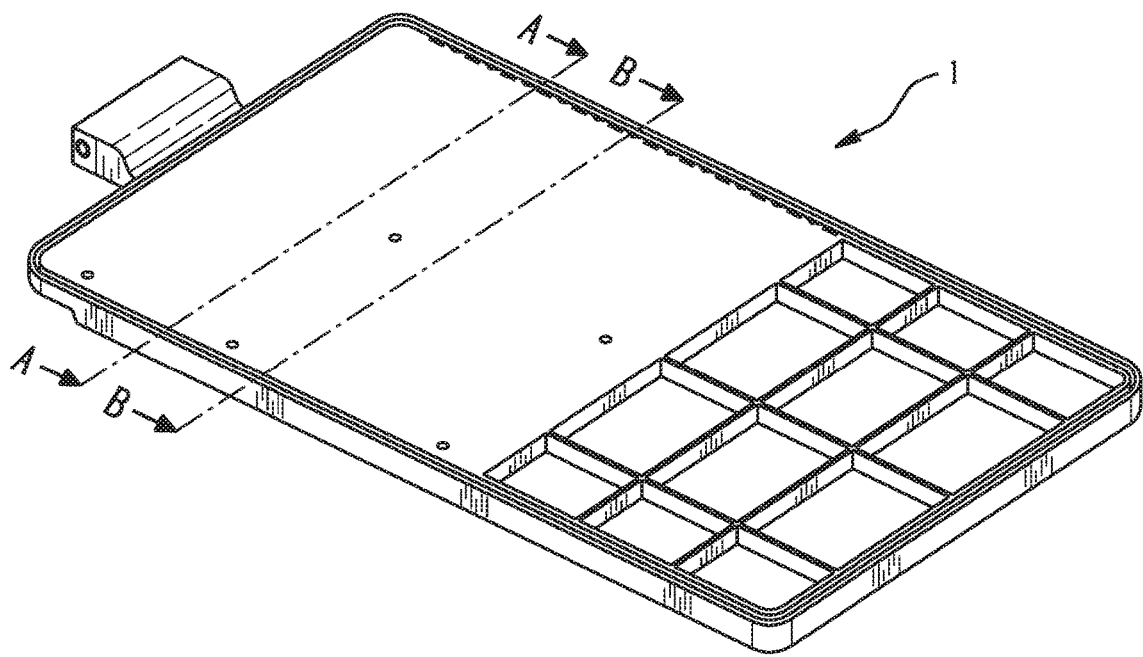
FIG. 4 is an isometric illustration of a tray table assembly.
Figure 5:
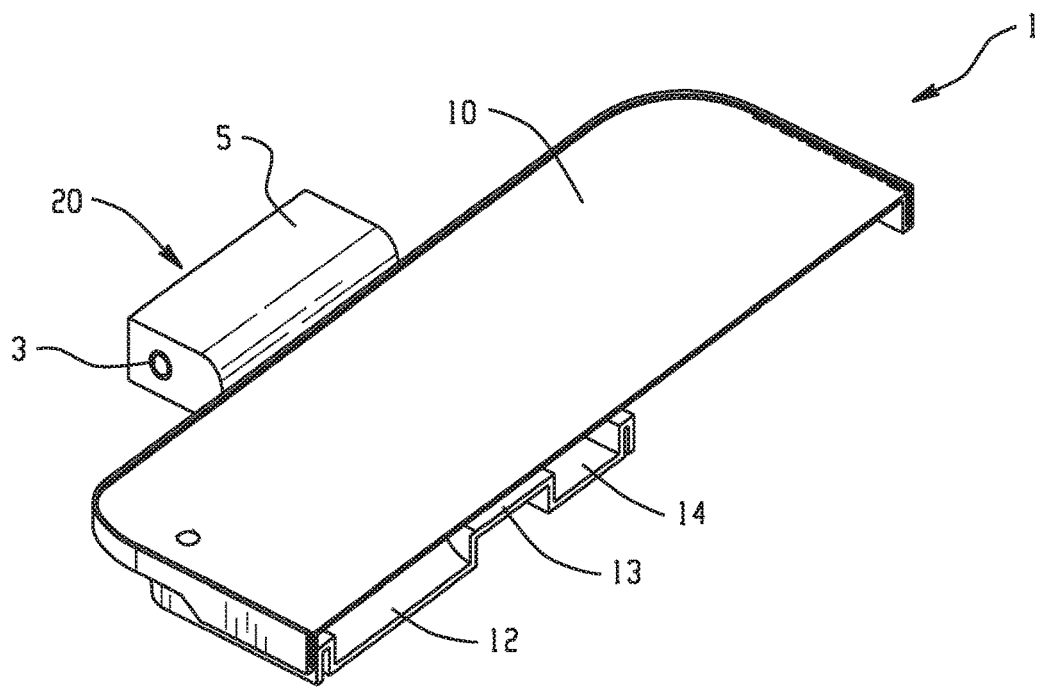
FIG. 5 is a cross-sectional view of the support arm of FIG. 4 taken along the line A-A.
Figure 6:
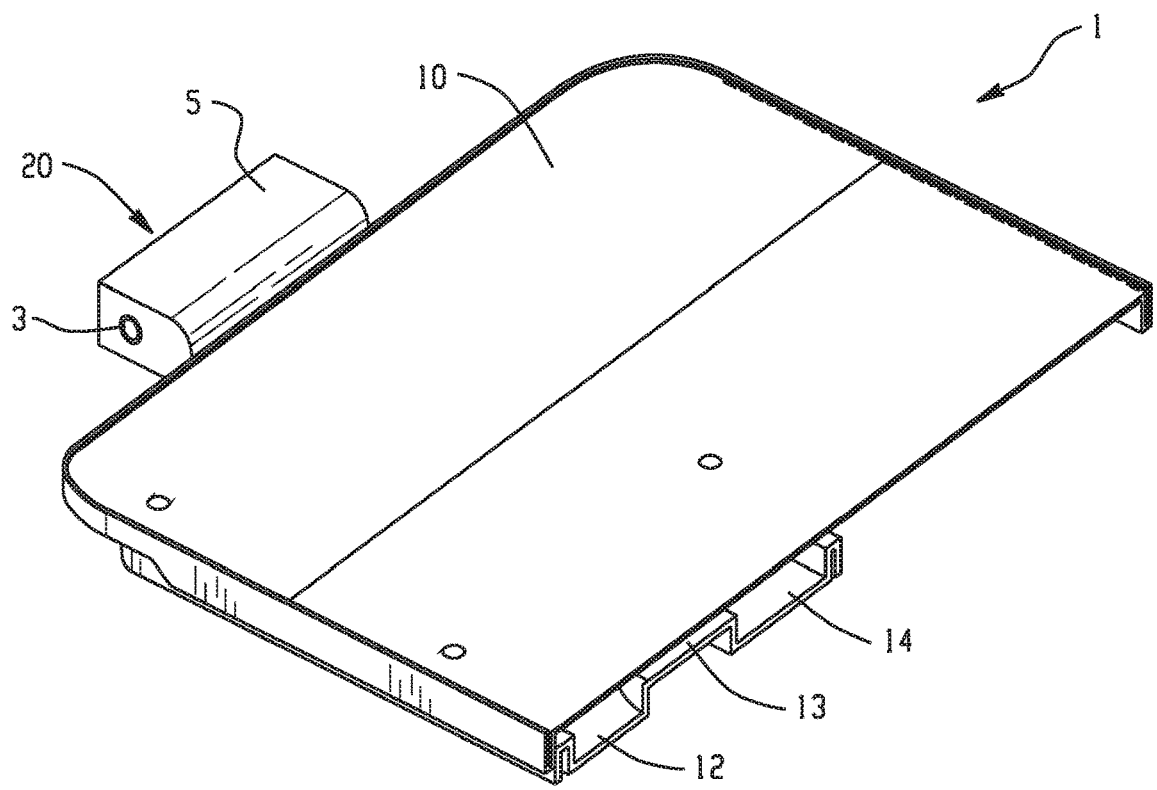
FIG. 6 is a cross-sectional view of the support arm of FIG. 4 taken along the line B-B.

FIGS. 1 and 2 illustrate components of a tray table assembly. In FIG. 1, a tray table 10 is illustrated, while in FIG. 2, a support arm 20 is illustrated. FIGS. 3 and 4 show the tray table assembly 1 including tray table 10 and support arm 20, where FIG. 3 is a bottom view of the tray table assembly 1 and FIG. 4 is a top view of the tray table assembly 1. FIG. 5 is a cross-sectional view of the tray table assembly 1 of FIG. 4 taken along line A-A, while FIG. 6 is a cross-sectional view of the tray table assembly 1 of FIG. 4 taken along line B-B. As can be seen in FIG. 1, tray table 10 can include openings 8 that can mate with corresponding apertures 22 on support arm 20. Tray table 10 can be designed with an indented portion 16 (FIG. 3) in which the support arm 20 can be placed so when the support arm 20 and tray table 10 are assembled, the support arm 20 can be flush with a bottom portion 18 of the tray table assembly 1. Openings 8 can extend through the tray table 10. Apertures 22 can extend through the support arm 20. An attachment device, e.g., a mechanical fastening device such as a screw, a nail, a pin, etc. or a chemical fastening device such as adhesives (e.g., glue, tape, pressure sensitive adhesives, etc.) can be used to attach the support arm 20 to the tray table 10 wherein the attachment device can extend through aperture 22 of support arm 20 and opening 8 of tray table 10. Apertures 22 can optionally contain inserts. The inserts can be metallic inserts. For example, the inserts include a material selected from aluminum, steel, brass, etc., as well as a combination comprising at least one of the foregoing. Tray table assembly 1 can optionally include a cover attached thereto on a side with the support arm 20 being attached on an opposite side.

As illustrated in FIG. 2, support arm 20, also referred to herein as hinged arm 20 (e.g., retractable hinged arm) can include a cross-sectional shape that can vary according to its position relative to each of the end points of the support arm 20. For example, a retractable hinged arm 20 can include a body 2, e.g., a substantially planar body, that can be formed of a thermoplastic material, optionally, a filled thermoplastic material. The body 2 can have major faces facing upward and downward, with one of the faces including an elongate central concavity 30 that can extend substantially along the length, l, of the body 2 and can open away from the body 2. The other face can include lateral concavities 26, 34 that can also extend substantially along the length, l, of the body 2. The central concavity 30 is also referred to herein as connecting member 30 and the lateral concavity 26 is also referred to herein as member 26 and the lateral concavity 34 is also referred to herein as ledge 34. The lateral concavities 26, 34 can be disposed on either side of the central concavity 30. The body 2 can have a cross-section taken along a datum (see e.g., line A-A and line B-B in FIG. 7) wherein the datum can extend traverse the length, l, of the body 2. The cross-section can define an inner "U" shaped portion 13 that can open upward, corresponding to the central concavity 30. The inner "U" shaped portion 13 can be sandwiched or disposed between outer "U" shaped portions 12, 14 on each side of the inner "U" shaped portion 13, wherein the outer "U" shaped portions 12, 14 can open downward, the inner "U" shaped portion 13 can open upward, and wherein the horizontal portions of outer "U" shaped portions 12, 14 can correspond to a respective lateral concavity 26, 34. The inner "U" shaped portion's 13 vertical portions can include vertical portions of the respective outer "U" shaped portions 12, 14. For example, outer "U" shaped portion 12 can correspond to lateral concavity 26, also referred to herein as member 26, while outer "U" shaped portion 14 can correspond to lateral concavity 34, also referred to herein as ledge 34. The vertical portions of the inner "U" shaped portion 13 can correspond to projection 28 of outer "U" shaped portion 12 and jut 32 of outer "U" shaped portion 14. The retractable hinged arm 20, e.g., support arm 20, can include a hinge 3 that can be disposed at a proximal portion 4 of the body 2 and a detent 5 that can be disposed proximal to the hinge 3, wherein the detent 5 can arrest rotation of the body 2 around the hinge 3. When the body 2 is in deployed mode, the body 2 can extend away from the hinge 3 to support weight at its distal portion 6. Outer "U" shaped portions 12, 14 are also referred to herein as first "U" shaped portion 12 and second "U" shaped portion 14.

Figure 7:
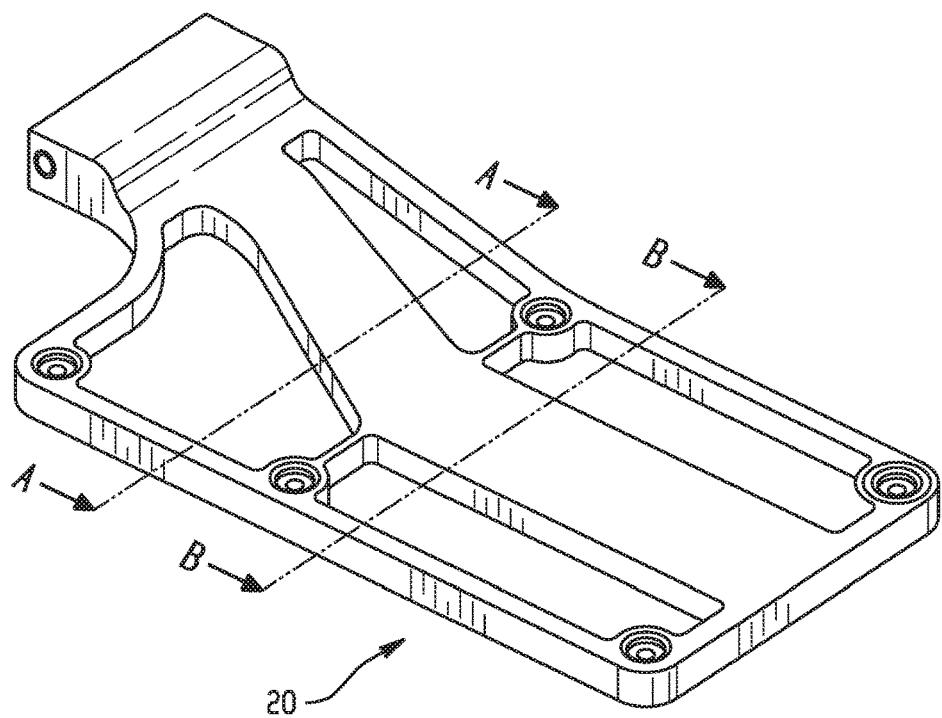
FIG. 7 is an isometric illustration of a support arm.
Figure 8:
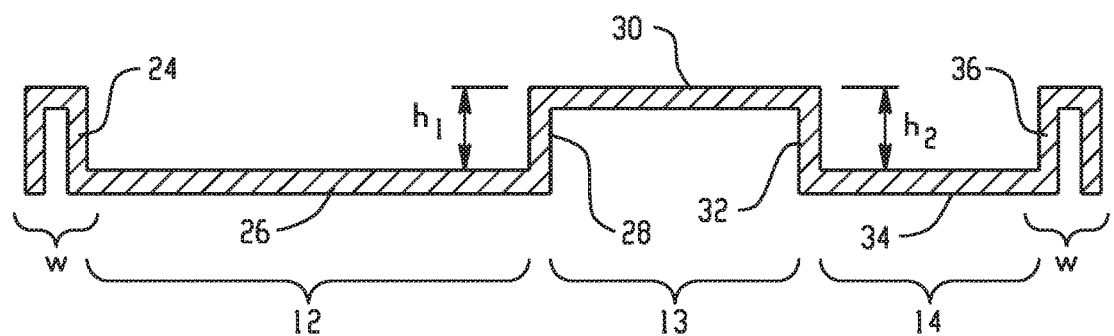
FIG. 8 is a cross-sectional view of the support arm of FIG. 7 taken along the line A-A.
Figure 9:
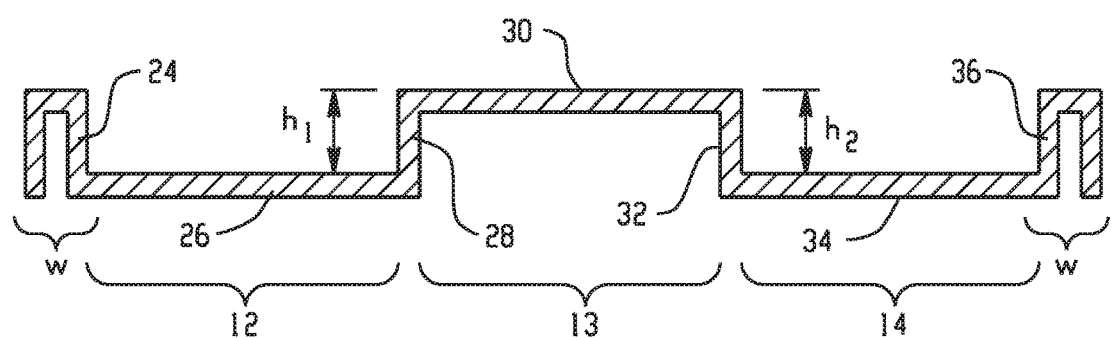
FIG. 9 is a cross-sectional view of the support arm of FIG. 7 taken along the line B-B.

FIG. 8 illustrates a cross-sectional view of support arm 20 along line A-A in FIG. 7, while FIG. 9 illustrates a cross-sectional view of support arm 20 along line B-B in FIG. 7. As shown in FIGS. 8 and 9, a cross-section of support arm 20 can comprise a first "U" shaped portion 12 having a leg 24 extending vertically therefrom with a member 26, e.g., lateral concavity 26, extending horizontally toward projection 28, which extends vertically from the member 26, e.g., lateral concavity 26. Similarly, second "U" shaped portion 14 as illustrated in FIG. 8 can have post 36 extending vertically therefrom with a ledge 34, e.g., lateral concavity 34, extending horizontally toward jut 32, which extends vertically from ledge 34. A connecting member 30, e.g., central concavity 30, can be disposed between the projection 28 of the first "U" shaped portion 12 and the jut 32 of the second "U" shaped portion 14. In other words, connecting member 30 joins the first and second "U" shaped portions 12, 14. Stated another way, the inner "U" shaped portion 13 is disposed between the outer "U" shaped portions 12, 14. The "U" shaped portions 12, 14 can provide additional structural integrity to the support arm 20 as well as increased stiffness and reduced stress on the part as compared to a support arm without "U" shaped portions. For example, in a support arm with a "U" shaped portion, stiffness can be increased by 5% to 30% as compared to a support arm without a "U" shaped portion. For example, the stiffness can be increased by 10% to 25%, for example, 15% to 20%. For example, in a support arm with a "U" shaped portion, maximum stress on the support arm can be reduced by 15% to 50% as compared to a support arm without a "U" shaped portion, for example, 20% to 40%, for example, 25% to 35%.

Leg 24, projection 28, jut 32, and post 36 can be of the same height and/or width or they can be of different heights and/or width. For example, as shown in FIGS. 8 and 9, the height and width of leg 24 and projection 28 can be the same as the height and width of jut 32 and post 36. The height of leg 24 and projection 28 can be less than that of jut 32 and post 36. For example, as illustrated in FIGS. 8 and 9, the leg 24 and projection 28 can have a height, $h_1$, while jut 32 and post 36 can have a height, $h_2$. The height, $h_1$ can be equivalent to the height, $h_2$. The height, $h_1$ can be less than the height, $h_2$. The height, $h_1$ can be greater than the height, $h_2$. It is to be understood, however, that leg 24 and projection 28 can have different heights respective to one another, while jut 32 and post 36 can have different heights respective to one another. For example a ratio of height between leg 24, projection 28, jut 32, and post 36 can be 1:1.1:1.2:1.4. Similarly, the thickness of the various components can be the same or different. For example, the thickness of leg 24, projection 28, jut 32, and post 36 can be the same or different. The thickness of member 26 and ledge 34 can be the same or different from one another. The thickness of the member 26 and ledge 34 can be the same or different from leg 24, projection 28, jut 32, and post 36. The height, width, and thickness of these components can each, individually, or together, be varied to meet the various design considerations.

The support arm 20 can include no "U" shaped portions. The support arm 20 can include additional "U" shaped portions on either end of the support arm 20 in addition to those illustrated in FIGS. 8 and 9. For example, support arm 20 can include additional "U" shaped portions on either side of the first "U" shaped portion 12 and/or on either side of the second "U" shaped portion 14. The support arm 20 can include greater than or equal to 1 "U" shaped portion. The support arm 20 can include greater than or equal to 2 "U" shaped portions. The support arm 20 can include greater than or equal to three "U" shaped portions. The support arm 20 can include greater than or equal to 4 "U" shaped portions. The support arm 20 can include greater than or equal to 5 "U" shaped portions. The support arm 20 can include greater than or equal to 10 "U" shaped portions. The various components of the "U" shaped members can have the same or different thicknesses. The "U" shaped portions can assist in achieving the desired level of stiffness and strength of the support arm.

The overall width (w) of the "U" shaped portion(s) used in the support arm 20 can be 5 millimeters (mm) to 75 mm. For example, the overall width (w) of the "U" shaped portion(s) can be 10 mm to 50 mm. The overall width (w) of the "U" shaped portion(s) can be 15 mm to 30 mm. The overall width (w) of the "U" shaped portion(s) can be 20 mm to 25 mm. In some embodiments, the overall width can be less than or equal to 75 mm, for example, less than or equal to 50 mm. The overall width can be less than or equal to 30 mm. The overall width can be less than or equal to 25 mm. The overall width can be less than or equal to 15 mm. The height (h) of the various "U" shaped portions can be 2 mm to 30 mm. The height of the "U" shaped portions can be 5 mm to 25 mm. The height of the "U" shaped portions can be 7.5 mm to 20 mm. The height of the "U" shaped portions can be 10 mm to 15 mm. The height of the "U" shaped portions can be 12 mm to 14 mm. In some embodiments, the overall height can be less than or equal to 30 mm, for example, less than or equal to 25 mm. The overall height can be less than or equal to 20 mm. The overall height can be less than or equal to 15 mm. The overall height can be less than or equal to 10 mm. The overall height can be less than or equal to 5 mm.

Depending on the number of legs present and the thickness of the various legs, the total volume of the "U" shaped portions can vary. For example, the total volume can be greater than or equal to 35,000 cubic millimeters ($mm^3$). The total volume can be greater than or equal to 45,000 $mm^3$. The total volume can be greater than or equal to 50,000 $mm^3$. The total volume can be greater than or equal to 60,000 $mm^3$. The total volume can be greater than or equal to 70,000 $mm^3$. The total volume can be greater than or equal to 80,000 $mm^3$. The total volume can be greater than or equal to 85,000 $mm^3$. The thickness for the thinner to thicker legs of the "U" shaped members can be 0.25 mm to 10 mm. The thickness can be 0.5 mm to 7.5 mm. The thickness can be 1 mm to 5 mm. The thickness can be 1.5 mm to 3 mm. The thickness can be 2 mm to 2.5 mm. For example, the thickness can be less than or equal to 7.5 mm. The thickness can be less than or equal to 5 mm. The thickness can be less than or equal to 3 mm. The thickness can be less than or equal to 2 mm. The thickness can be less than or equal to 1.5 mm. The thickness can be less than or equal to 1 mm. The thickness can be less than or equal to 0.5 mm.

Figure 10:
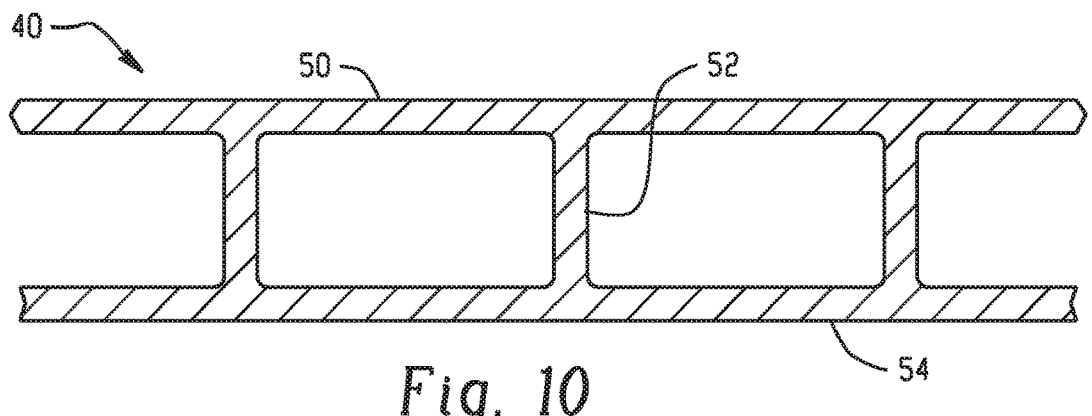
FIG. 10 is a partial, cross-sectional view of a multiwall structure.
Figure 11:
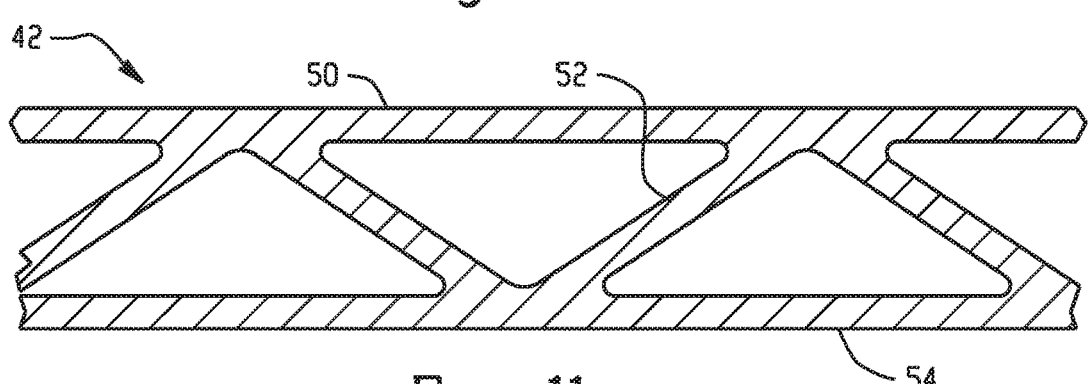
FIG. 11 is a partial, cross-sectional view of another multiwall structure.
Figure 12:
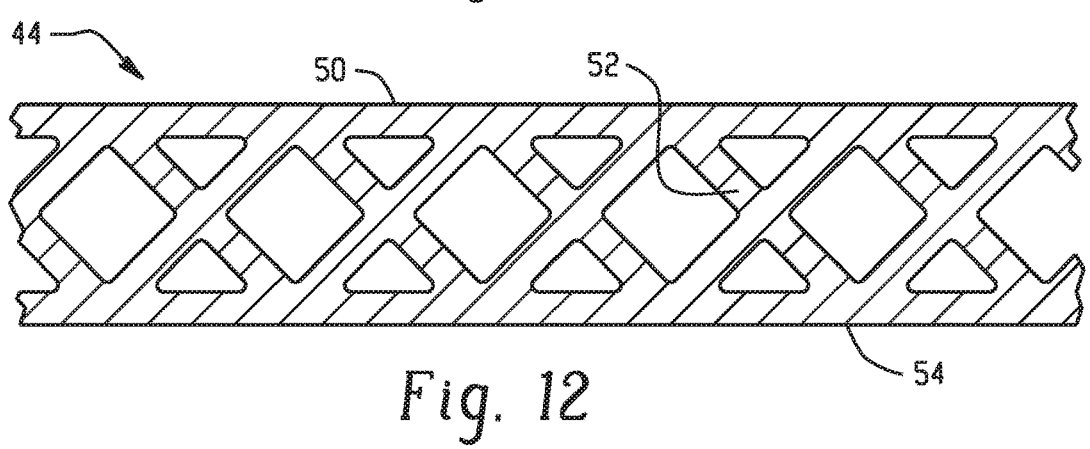
FIG. 12 is a partial, cross-sectional view of another multiwall structure.
Figure 13:
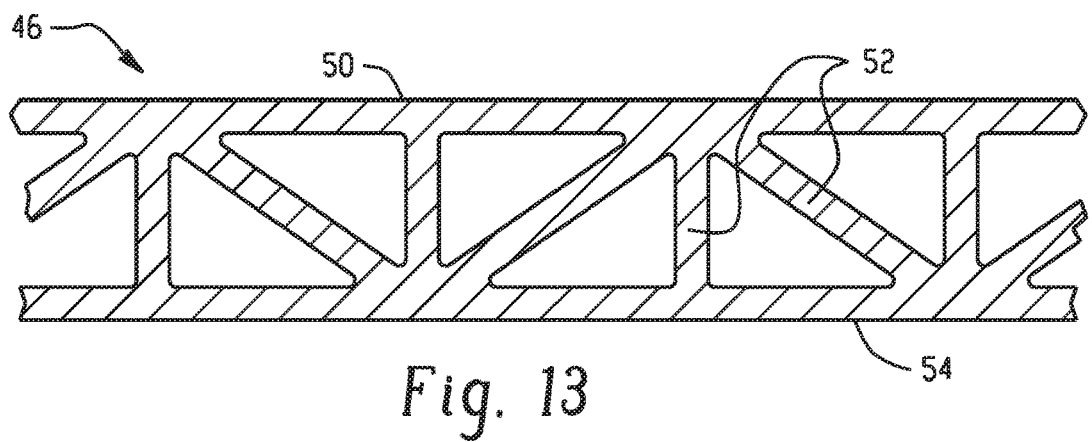
FIG. 13 is a partial, cross-sectional view of still another multiwall structure.

The "U" shaped portions in FIGS. 8 and 9 can include a multiwall structure. FIGS. 10 to 13 illustrate various multiwall structural designs that can provide additional structural enhancement to tray table 10 and/or support arm 20. For example, FIGS. 10 through 13 illustrate multiwall structures 40, 42, 44, 46, respectively having a first wall 50, second wall 54, and ribs 52 disposed between the first wall 50 and the second wall 54. The ribs 52 can have any configuration that will help achieve the desired mechanical and structural properties of a support arm and/or tray table. Ribs 52 can be attached to one wall of the multiwall structure 40, 42, 44, 46, and/or can be attached to any two walls of the multiwall structure 40, 42, 44, 46, and/or can be floating in the various layers of the multiwall structure 40, 42, 44, 46 (e.g., not attached to any walls of the multiwall structure 40, 42, 44, 46). In FIG. 10, the ribs 52 are illustrated as being perpendicularly disposed between the first wall 50 and the second wall 54, while in FIG. 11, the ribs 52 are disposed at an angle, i.e., diagonally (e.g., greater than or equal to 45°) between the first wall 50 and the second wall 54. In FIG. 12, the ribs 52 form a generally "X" shape and are disposed diagonally between first wall 50 and second wall 54, while in FIG. 13, the ribs 52 are disposed diagonally and perpendicularly between the first wall 50 and the second wall 54.

Any of the designs described herein can include a multiwall structure with walls and ribs as illustrated in FIGS. 10 to 13. For example, with reference to FIGS. 8 and 9, any of the leg 24, member 26, projection 28, connecting member 30, jut 32, ledge 34, and/or post 36 can include a multiwall structure as illustrated in FIGS. 10 to 13. "U" shaped portions can include a multiwall structure as illustrated in FIGS. 10 to 13. The multiwall structures disclosed herein can optionally comprise various combinations of ribs (e.g., vertical, diagonal, and any combination thereof) as is desired, e.g., for additional structural integrity. The number of walls (e.g., first, second, etc.) can additionally vary and be based upon the desired properties for the end use of the multiwall structure. For example, greater than or equal to 2 walls can be present, for example, greater than or equal to 3 walls, for example, greater than or equal to 5 walls, for example, greater than or equal to 10 walls can be present. The presence of the multiwall structure can assist in achieving the desired level of stiffness and strength in the multiwall part. Any rib, and wall arrangement is based upon the desired structural integrity for the particular multiwall structure, based upon where the multiwall structure will be employed and the loads it will experience. Any number of walls can be used, with any combination of support arms being contemplated for use.

The support arm can be formed via injection molding, such as 1-shot or 2-shot injection molding, using heat and cool technology, where a mold is rapidly heated and kept at that elevated temperature during the injection and packing phase of the thermoplastic material and subsequently cooled to the required mold temperature. This process is beneficial as it surprisingly allows for the reduction, even as much as by a fraction of a millimeter in support arm thickness of the minimum thickness. It was found that using this process, a minimum thickness of as little as 1 millimeter (mm) could be obtained depending upon the viscosity of the thermoplastic material. Additionally, this heat and cool process can also improve the knit line strength of the part, which can enhance the overall part structural performance.

For example, injection molding using heat and cool technology can involve rapidly heating the mold at a rate of 10 to 40 degrees centigrade per second (° C./sec), specifically 12 to 25° C./sec to greater than or equal to the glass transition temperature of the thermoplastic material. The mold can be heated to a temperature greater than or equal to 180° C., specifically greater than or equal to 200° C. Once the mold has reached its heated mold temperature, the thermoplastic material can be injected (filled) and packed into the mold. The thermoplastic material can be injected at a temperature of greater than or equal to the melt temperature of the materials. The thermoplastic material can be injected at a temperature of greater than or equal to 350° C., for example, greater than or equal to 390° C., for example, greater than or equal to 400° C. Subsequently, the mold can be cooled (e.g., rapidly cooled such as at a rate of 5 to 20° C./sec, for example, 10 to 12° C./sec). The mold can be cooled such that the thermoplastic material cools to a temperature of less than its ejection temperature. The thermoplastic material can then be ejected from the mold. The process can then be repeated for the production of a subsequent support arm.

The following examples are provided as non-limiting examples of the present disclosure.

EXAMPLES

Example 1

In the following examples, ABAQUS simulation software is used to calculate mechanical properties of various support arm and tray table designs. Polyetherimide resin which is 40% carbon fiber filled is used, i.e., ULTEM™ THERMOCOMP EC008PXQ resin, commercially available from SABIC's Innovative Plastics business. The stress versus strain curve for the resin is used as material properties in carrying out the structural analysis on the support arm and tray table designs.

In this example, support arm designs A to D as illustrated in FIGS. 14A1, 14A2, 14B1, 14B2, 14C1, 14C2, 14D1, and 14D2 are considered and analyzed. The designs are analyzed according to the loading conditions shown in FIG. 15 with the boundary conditions illustrated in FIGS. 16A to C. As shown in FIG. 15, a 100 Newton (N) load is applied in the direction perpendicular to the plane. For example, if the support arm lies in plane xz, then the 100 N load is applied in the −y direction. For the Boundary Conditions, the support arm is fixed at locations 112, 114 in FIG. 16B such that it can rotate about the axis of the hole. Portion 74 is fixed to move along the direction shown by arrow 75 (see FIG. 16C). Total volume of each of the support arm designs is listed in Table 1, measured in cubic millimeters.

TABLE 1

| Design | Total Volume (mm³) |
|---|---|
| A | 237,928.6 |
| B | 387,642.9 |
| C | 247,357.1 |
| D | 257,714.3 |

Table 2 demonstrates the various stress and displacements properties of each of the designs illustrated in FIG. 14. Mass of each support arm is calculated in grams (g) from CAD (computer Added Design) software such as SOLIDWORKS. Through computer simulation using ABAQUS simulation software, maximum displacement is monitored and recorded in mm, and the magnitude and location of maximum stress is monitored and recorded in MegaPascals (MPa). The stress is used to predict failure of materials under any loading condition from results of uniaxial tensile tests. As previously described, a load of 100 N is applied as shown in FIGS. 15 and 16. As can be seen in Table 2, Design D is the stiffest with the least amount of maximum stress among the designs tested. Design B has the least deformation, but due to its geometric configuration, maximum stress for the design is greater than that seen in Design D. Ribs can be added to any of the designs to provide additional stiffness to the support arm.

For Design A, the maximum stress is observed at location 100 in FIG. 14A1, for Design B, location 102 in FIG. 14B1, for Design C, location 104 in FIG. 14C2, and for Design D, location 106 in FIG. 14D1. The location at which maximum stress is observed is understood to be the portion where failure can happen. As a result, it can be beneficial to design this portion to be the strongest portion of the part during the design phase.

TABLE 2

| Design # | Mass (g) | Maximum Displacement (mm) | Maximum Stress (MPa) |
|---|---|---|---|
| A | 333.1 | 17.27 | 273.08 |
| B | 542.7 | 4.58 | 199.8 |
| C | 346.3 | 7.05 | 169.18 |
| D | 360.8 | 4.78 | 130.73 |

Example 2

In this example, support arm designs E and F as illustrated in FIGS. 17E1, 17E2, 17F1, and 17F2 are considered and analyzed. The designs are analyzed according to the loading conditions shown in FIG. 15 with the boundary conditions illustrated in FIGS. 16A-C. As shown in FIG. 15, a 100 Newton (N) load is applied in the direction perpendicular to the plane. For the Boundary Conditions, the support arm is fixed at locations 112, 114 in FIG. 16B such that it can rotate about the axis of the hole. Portion 74 is fixed to move along the direction shown by arrow 75 as shown in FIG. 16C. Design E does not have a multiwall structure, while Design F has a multiwall structure, where the multiwall structure is located around the perimeter 62 of the support arm. Design E and Design F have the same overall thickness, which is 3 mm.

TABLE 3

| Design | Mass (g) | Maximum Displacement (mm) | Maximum Stress (MPa) |
| --- | --- | --- | --- |
| E | 360.8 | 4.78 | 130.73 |
| F | 398.9 | 4.13 | 95.66 |

As shown in Table 3, Design F, with a multiwall structure located along the edges of the support arm, maximum stress and maximum displacement are reduced even further compared to Designs A to D. Additionally, although the weight is slightly increased, there is a large reduction in stress and displacement. Ribs can be added to Design E if desired. For Designs E and F, the maximum stress is located in nearly the same position as shown by location 108 in Design E in FIG. 17E1 and location 110 in Design F in FIG. 17F1.

Example 3

Figure 19:
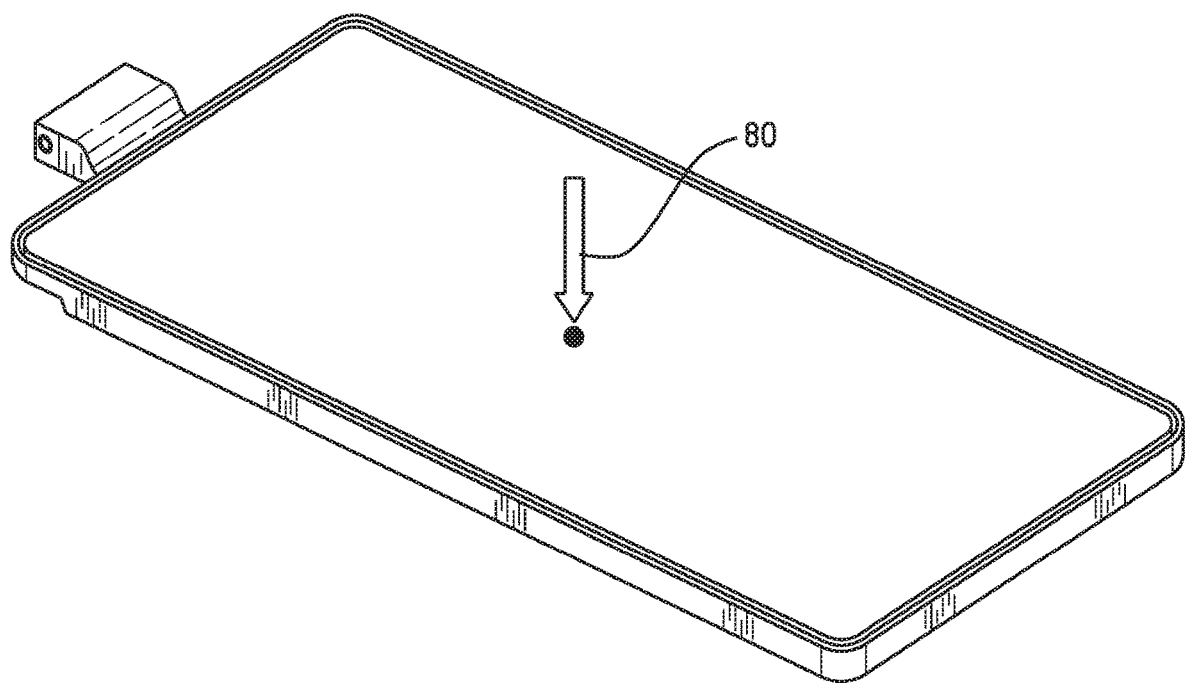
FIG. 19 is an illustration of the loading for the designs in FIGS. 18G1, 18G2, 18H1, and 18H2.

In this example, the tray table has a multiwall structure. FIGS. 18G1 and 18G2 illustrates that Design G is a comparative example having no multiwall structure with a mass of 810.12 grams, while FIGS. 18H1 and 18H2 illustrate that Design H is an example having a multiwall structure with a mass of 907.34 grams. The multiwall structure is located around the perimeter 60 of the tray table. A downward load of 680 N is applied at location 80 shown in FIG. 19.

TABLE 4

| Design | Mass (g) | Maximum Displacement (mm) | Maximum Stress (MPa) |
| --- | --- | --- | --- |
| G | 810.1 | 43.41 | 60.57 |
| H | 907.3 | 41.96 | 46.37 |

As shown in Table 4, there is a large reduction in stress from Design G to Design H, even though there is a small increase in weight compared to Design G. The reduction in the maximum stress value can be attributed to the addition of the multiwall structure in Design H. Although not wishing to be bound by theory. Ribs can be added to Design G if desired to achieve the desired level of stiffness and/or strength. The maximum stress is located in nearly the same location as seen by point 70 for Design G in FIG. 18G1 and point 72 for Design H in FIG. 18H1.

The tray table assemblies and methods of making and using the same disclosed herein include at least the following embodiments:

Embodiment 1: A support arm, includes: a thermoplastic material; and a filler; wherein a cross-section of the support arm taken along a line from an inner edge to an outer edge of the support arm comprises a first "U" shaped portion and a second "U" shaped portion; wherein extending horizontally from a leg of the first "U" shaped portion is a member having a projection extending vertically toward the leg and wherein extending horizontally from a post of the second "U" shaped portion is a ledge having a jut extending vertically toward the post; wherein a connecting member is disposed between the projection and the jut.

Embodiment 2: The support arm of Embodiment 1, wherein the filler comprises a fiber filler.

Embodiment 3: The support arm of Embodiment 2, wherein the fiber filler comprises a glass fiber or a carbon fiber.

Embodiment 4: The support arm of any of Embodiments 1 to 3, wherein the leg and the projection have a first height, $h_1$, and the jut and the post have a second height, $h_2$.

Embodiment 5: The support arm of Embodiment 4, wherein the first height, $h_1$, is greater than the second height, $h_2$.

Embodiment 6: The support arm of Embodiment 4, wherein the first height, $h_1$, is less than the second height, $h_2$.

Embodiment 7: The support arm of Embodiment 4, wherein the first height, $h_1$, is equal to the second height, $h_2$.

Embodiment 8: The support arm of any of Embodiments 1 to 7, wherein a thickness of the leg, projection, jut, and post is less than a thickness of the member, connecting member, and ledge.

Embodiment 9: The support arm of any of Embodiments 1 to 8, wherein the leg, and/or member, and/or projection, and/or connecting member, and/or jut, and/or ledge, and/or post comprises a multiwall structure.

Embodiment 10: The support arm of Embodiment 9, wherein the multiwall structure comprises a first wall and a second wall with a rib disposed between the first wall and the second wall.

Embodiment 11: The support arm of any of Embodiments 1 to 10, wherein the multiwall structure is located along a perimeter of the support arm.

Embodiment 12: The support arm of any of Embodiments 1 to 10, wherein the multiwall structure comprising greater than or equal to three walls.

Embodiment 13: The support arm of any of Embodiments 1 to 12, wherein the support arm includes greater than or equal to three "U" shaped portions.

Embodiment 12: A method of making a support arm includes: heating a mold to a glass transition temperature of a thermoplastic material; injecting the thermoplastic material comprising a filler into the mold and allowing the thermoplastic material to conform to the mold; cooling the mold to an ejection temperature to form the support arm; and ejecting the support arm from the mold; wherein a cross-section of the support arm taken along a line from an inner edge to an outer edge of the support arm comprises a first "U" shaped portion and a second "U" shaped portion.

Embodiment 13: The method of Embodiment 12, wherein extending horizontally from a leg of the first "U" shaped portion is a member having a projection extending vertically toward the leg and wherein extending horizontally from a post of the second "U" shaped portion is a ledge having a jut extending vertically toward the post; wherein a connecting member is disposed between the projection and the jut.

Embodiment 14: A tray table assembly includes: a support arm comprising a material selected from metallic material, metallic alloy material, or a thermoplastic material, wherein a cross-section of the support arm taken along a line from an inner edge to an outer edge of the support arm comprises a first "U" shaped portion and a second "U" shaped portion joined by a connecting member; a tray table; wherein a perimeter of the support arm comprises a multiwall structure or wherein a perimeter of the tray table comprises a multiwall structure or wherein a perimeter of the support arm and a perimeter of the tray table comprises a multiwall structure.

Embodiment 15: The tray table assembly of Embodiment 14, wherein extending horizontally from a leg of the first "U" shaped portion is a member having a projection extending vertically toward the leg and wherein extending horizontally from a post of the second "U" shaped portion is a ledge having a jut extending vertically toward the post; wherein a connecting member is disposed between the projection and the jut.

Embodiment 16: The tray table assembly of Embodiment 15, wherein the leg and the projection have a first height, $h_1$, and the jut and the post have a second height, $h_2$.

Embodiment 17: The tray table assembly of Embodiment 16, wherein the first height, $h_1$, is greater than the second height, $h_2$, or wherein the first height, $h_1$, is less than the second height, $h_2$.

Embodiment 18: The tray table assembly of any of Embodiments 15 to 17, wherein a thickness of the leg, projection, jut, and post is less than a thickness of the member, connecting member, and ledge.

Embodiment 19: The tray table assembly of any of Embodiments 15 to 18, wherein the leg, and/or member, and/or projection, and/or connecting member, and/or jut, and/or ledge, and/or post comprises a multiwall structure.

Embodiment 20: The tray table assembly of any of Embodiments 14 to 19, wherein the thermoplastic material includes a filler comprising fibers.

Embodiment 21: A retractable hinged arm, comprising: an elongate, substantially planar body formed of a filled thermoplastic material, the body, in a deployed mode, having major faces facing upward and downward, with one of the faces defining an elongate central concavity extending substantially the length of the body, opening away from the body, and the other face defining lateral concavities extending substantially the length of the body disposed on each side of the central concavity, wherein the body has a cross-section, taken along a datum extending transverse the length of the body, defining an inner "U" shaped portion, corresponding to the central concavity, the inner "U" shaped portion sandwiched between outer "U" shaped portions disposed on each side of the inner "U" shaped portion, each of the outer "U" shaped portions corresponding to a respective lateral concavity, with the inner "U" shaped portion's vertical portions comprising vertical portions of respective outer "U" shaped portions; a hinge disposed at a proximal portion of body; and a detent disposed proximal the hinge, the detent to arrest rotation of the body around the hinge; wherein, in the deployed mode, the body extends away from the hinge to support a weight at its distal portion.

Embodiment 22: The retractable hinged arm of Embodiment 21, wherein the filler comprises a fiber filler.

Embodiment 23: The retractable hinged arm of Embodiment 22, wherein the fiber filler comprises a glass fiber or a carbon fiber.

Embodiment 24: The retractable hinged arm of any of Embodiments 21 to 23, wherein one of the outer "U" shaped portion includes a leg and a projection having a first height, $h_1$, and wherein the other outer "U" shaped portion includes a jut and a post having a second height, $h_2$.

Embodiment 25: The retractable hinged arm of Embodiment 24, wherein the first height, $h_1$, is greater than the second height, $h_2$.

Embodiment 26: The retractable hinged arm of Embodiment 24, wherein the first height, $h_1$, is less than the second height, $h_2$.

Embodiment 27: The retractable hinged arm of Embodiment 24, wherein the first height, $h_1$, is equal to the second height, $h_2$.

Embodiment 28: The retractable hinged arm of any of Embodiments 21 to 27, wherein a thickness of the leg, projection, jut, and post is less than a thickness of the lateral concavities and central concavity.

Embodiment 29: The retractable hinged arm of any of Embodiments 21 to 28, wherein the leg, and/or lateral concavities, and/or projection, and/or central concavity, and/or jut, and/or post comprises a multiwall structure.

Embodiment 30: The retractable hinged arm of Embodiment 29, wherein the multiwall structure comprises a first wall and a second wall with a rib disposed between the first wall and the second wall.

Embodiment 31: The retractable hinged arm of any of Embodiments 21 to 30, wherein the multiwall structure is located along a perimeter of the retractable hinged arm.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A retractable hinged arm, comprising:
an elongate, substantially planar body formed of a filled thermoplastic material, the body, in a deployed mode, having major faces facing upward and downward, with one of the faces defining an elongate central concavity, and the other face defining lateral concavities disposed on each side of the central concavity, wherein the body has a cross-section defining an inner convex "U" shaped portion, corresponding to the central concavity, the inner convex "U" shaped portion sandwiched between first and second outer "U" shaped portions disposed on each side of the inner convex "U" shaped portion, each of the first and second outer "U" shaped portions corresponding to a respective lateral concavity, with the inner convex "U" shaped portion's vertical portions comprising vertical portions of respective outer "U" shaped portions;

first and second perimeter convex "U" shaped portions, each of the first and second perimeter convex "U" shaped portions corresponding to a respective outer "U" shaped portion, with a vertical portion of the first and second perimeter convex "U" shaped portions comprising a vertical portion of a respective outer "U" shaped portion;

a hinge disposed at a proximal portion of the body; and a detent disposed proximal the hinge, the detent to arrest rotation of the body around the hinge;

wherein, in the deployed mode, the body extends away from the hinge to support a weight at its distal portion, and wherein the body has
 a first cross-section defining a first inner convex "U" shaped portion, corresponding to the central concavity, the first inner convex "U" shaped portion sandwiched between first outer "U" shaped portions disposed on each side of the first inner convex "U" shaped portion, each of the first outer "U" shaped portions corresponding to a respective first lateral concavity, with the first inner convex "U" shaped portion's vertical portions comprising vertical portions of respective first outer "U" shaped portions, each of the first outer "U" shaped portions having a same width; and
 a second cross-section defining a second inner convex "U" shaped portion, corresponding to the central concavity, the second inner convex "U" shaped portion sandwiched between second outer "U" shaped portions disposed on each side of the second inner convex "U" shaped portion, each of the second outer "U" shaped portions corresponding to a respective second lateral concavity, with the second inner convex "U" shaped portion's vertical portions comprising vertical portions of respective second outer "U" shaped portions, each of the second outer "U" shaped portions having a different width.

2. The retractable hinged arm of claim 1, wherein the filler comprises a fiber filler.

3. The retractable hinged arm of claim 2, wherein the fiber filler comprises a glass fiber or a carbon fiber.

4. The retractable hinged arm of claim 1, wherein one of the outer "U" shaped portion includes a leg and a projection having a first height, $h_1$, and wherein the other outer "U" shaped portion includes a jut and a post having a second height, $h_2$.

5. The retractable hinged arm of claim 4, wherein the first height, $h_1$, is equal to the second height, $h_2$.

6. The retractable hinged arm of claim 1, comprising a leg, a projection, a jut, and a post, wherein a thickness of the leg, the projection, the jut, and the post is less than a thickness of the lateral concavities and central concavity.

7. The retractable hinged arm of claim 1, comprising a leg, a projection, a jut, and a post, wherein the leg, and/or the lateral concavities, and/or the projection, and/or the central concavity, and/or the jut, and/or the post comprises a multiwall structure.

8. The retractable hinged arm of claim 7, wherein the multiwall structure comprises a first wall and a second wall with a rib disposed between the first wall and the second wall.

9. The retractable hinged arm of claim 7, wherein the multiwall structure is located along a perimeter of the retractable hinged arm.

10. The retractable hinged arm of claim 1, wherein the retractable hinged arm is made by:
 heating a mold to a glass transition temperature of a thermoplastic material;
 injecting the thermoplastic material comprising a filler into the mold and allowing the thermoplastic material to conform to the mold;
 cooling the mold to an ejection temperature to form the retractable hinged arm; and
 ejecting the retractable hinged arm from the mold.

11. The method of claim 10, wherein extending horizontally from a leg of the first "U" shaped portion is a member having a projection extending vertically toward the leg and wherein extending horizontally from a post of the second "U" shaped portion is a ledge having a jut extending vertically toward the post; wherein a connecting member is disposed between the projection and the jut.

12. A tray table assembly, comprising:
 the retractable hinged arm of claim 1 further comprising a material selected from metallic material, metallic alloy material, or a thermoplastic material, wherein the first "U" shaped portion and the second "U" shaped portion are joined by a connecting member; and
 a tray table;
 wherein a perimeter of the retractable hinged arm comprises a multiwall structure or wherein a perimeter of the tray table comprises a multiwall structure or wherein a perimeter of the retractable hinged arm and a perimeter of the tray table comprises a multiwall structure.

13. The tray table assembly of claim 12, wherein extending horizontally from a leg of the first "U" shaped portion is a member having a projection extending vertically toward the leg and wherein extending horizontally from a post of the second "U" shaped portion is a ledge having a jut extending vertically toward the post;
 wherein the connecting member is disposed between the projection and the jut.

14. The tray table assembly of claim 13, wherein the leg and the projection have a first height, $h_1$, and the jut and the post have a second height, $h_2$.

15. The tray table assembly of claim 13, wherein a thickness of the leg, projection, jut, and post is less than a thickness of the member, connecting member, and ledge.

16. The tray table assembly of claim 13, wherein the leg, and/or member, and/or projection, and/or connecting member, and/or jut, and/or ledge, and/or post comprises a multiwall structure.

17. The tray table assembly of claim 12, wherein the thermoplastic material includes a filler comprising fibers.

18. The retractable hinged arm of claim 1, further comprising apertures extending through the major faces of the retractable hinged arm and configured to mate with openings in a tray table.

\* \* \* \* \*